(12) United States Patent
Wilmhoff et al.

(10) Patent No.: US 9,209,851 B1
(45) Date of Patent: *Dec. 8, 2015

(54) ELECTRONIC DEVICE CASE WITH ANTENNA

(71) Applicant: BluFlux RF Technologies, LLC, Lousiville, CO (US)

(72) Inventors: Benjamin Russell Wilmhoff, Boulder, CO (US); Andrew David Rowser, Boulder, CO (US)

(73) Assignee: BLUFLUX RF TECHNOLOGIES, LLC, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,675

(22) Filed: Dec. 18, 2014

Related U.S. Application Data

(63) Continuation of application No. 14/322,027, filed on Jul. 2, 2014, now Pat. No. 8,954,122.

(51) Int. Cl.
| | |
|---|---|
| *H04M 1/00* | (2006.01) |
| *H04B 1/3888* | (2015.01) |
| *H04B 5/00* | (2006.01) |
| *H04B 1/3827* | (2015.01) |

(52) U.S. Cl.
CPC ............ *H04B 1/3888* (2013.01); *H04B 1/3838* (2013.01); *H04B 5/0031* (2013.01); *H04B 5/0081* (2013.01)

(58) Field of Classification Search
CPC ........ H04W 4/02; H04Q 1/245; H04Q 1/243; H04M 1/00; H04B 1/3888; H04B 5/0081; H04B 5/0031; H04B 1/3838
USPC ........ 455/83, 575.7, 575.1; 340/572.5, 572.1, 340/572.7; 342/375, 368, 372
See application file for complete search history.

(56) References Cited

U.S. PATENT DOCUMENTS

| | | | |
|---|---|---|---|
| 5,995,064 A * | 11/1999 | Yanagisawa | H01Q 1/242 343/702 |
| 6,249,256 B1 | 6/2001 | Luxon et al. | |
| 6,717,801 B1 * | 4/2004 | Castell | G06F 1/1616 361/679.09 |
| 7,180,464 B2 | 2/2007 | Chiang et al. | |
| 7,876,272 B2 | 1/2011 | Dou et al. | |
| 8,208,980 B2 | 6/2012 | Wong et al. | |
| 8,214,003 B2 | 7/2012 | Wong et al. | |
| 8,442,602 B2 | 5/2013 | Wong et al. | |
| 8,750,948 B2 | 6/2014 | Wong et al. | |
| 2003/0045246 A1 | 3/2003 | Lee et al. | |
| 2008/0094222 A1 * | 4/2008 | Kaoru | A45C 15/00 340/572.7 |
| 2012/0206302 A1 * | 8/2012 | Ramachandran | H01Q 1/24 343/702 |
| 2012/0206303 A1 * | 8/2012 | Desclos | H01Q 1/243 343/702 |
| 2013/0076573 A1 * | 3/2013 | Rappoport | H01Q 1/243 343/702 |
| 2014/0062799 A1 * | 3/2014 | Sutherland | H01Q 1/2266 343/702 |

* cited by examiner

*Primary Examiner* — Mahendra Patel
(74) *Attorney, Agent, or Firm* — pkalousek.ip

(57) ABSTRACT

A method for improving signal quality for a mobile electronic device and an apparatus embodying the method, comprising a protective case comprising a shell that encases at least a portion of the mobile electronic device; an external antenna assembly position-ably attached to the shell; a transmission line attached to the shell and electrically interconnected to the case antenna; and a near-field coupling device attached to the shell and having a feed port electrically interconnected to the transmission line, the near-field coupling device configured to near-field couple to a native antenna of the encased mobile electronic device to capture an electromagnetic signal generated by the native antenna of the mobile electronic device.

15 Claims, 16 Drawing Sheets

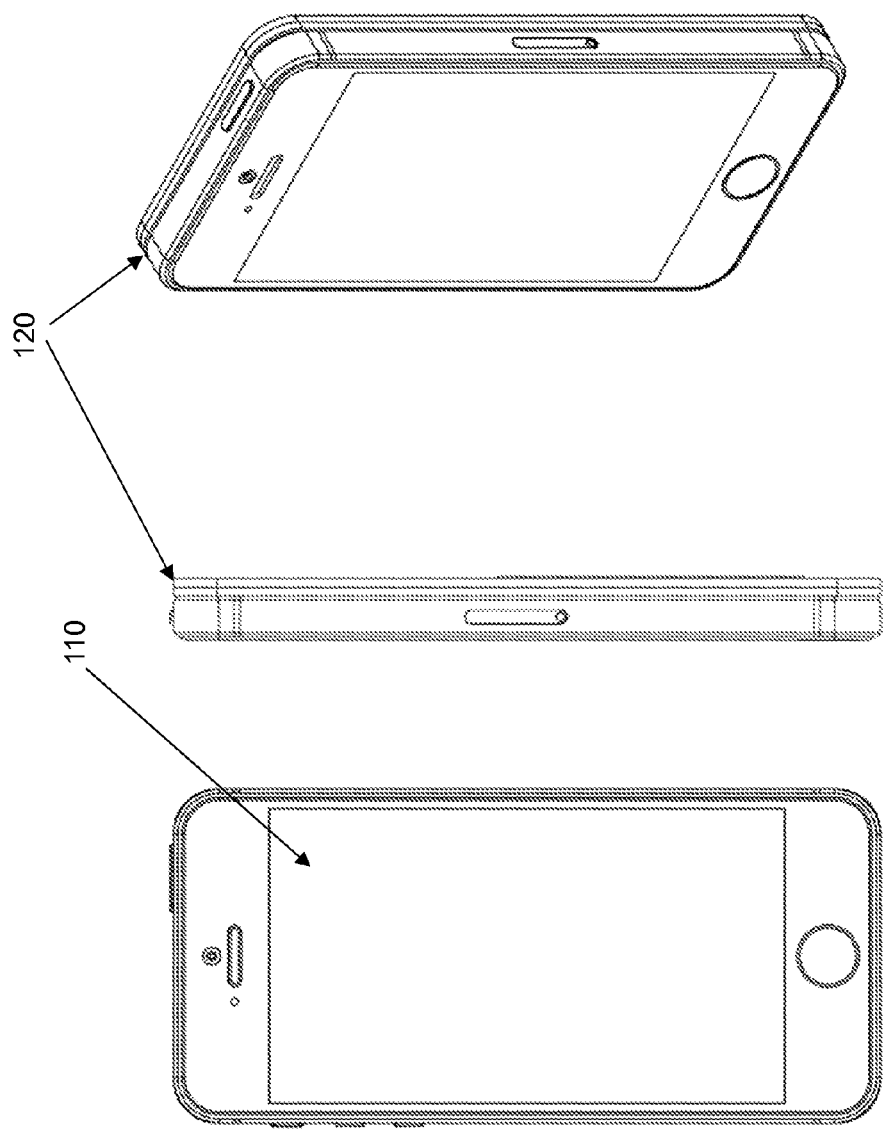

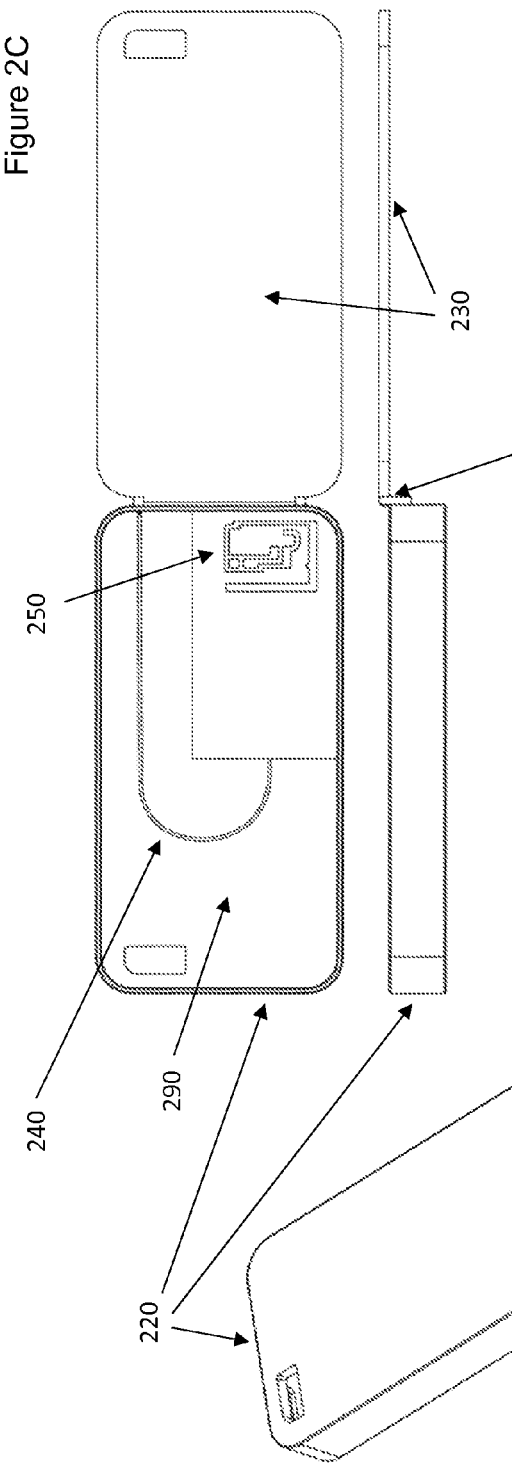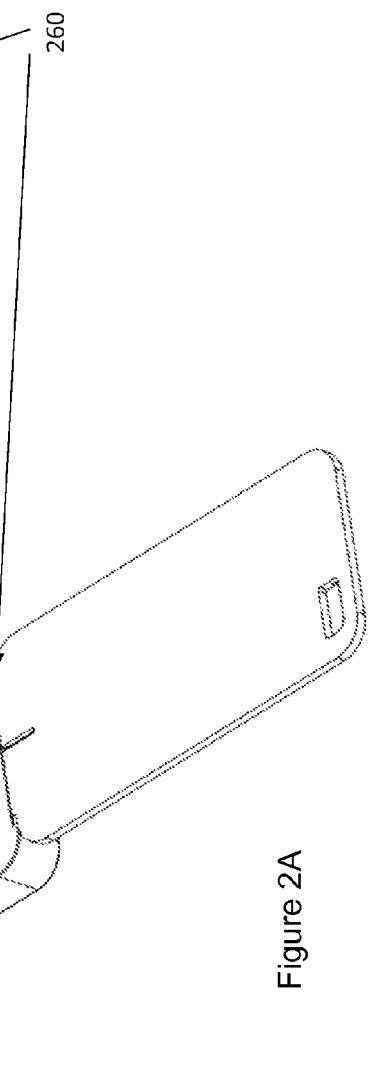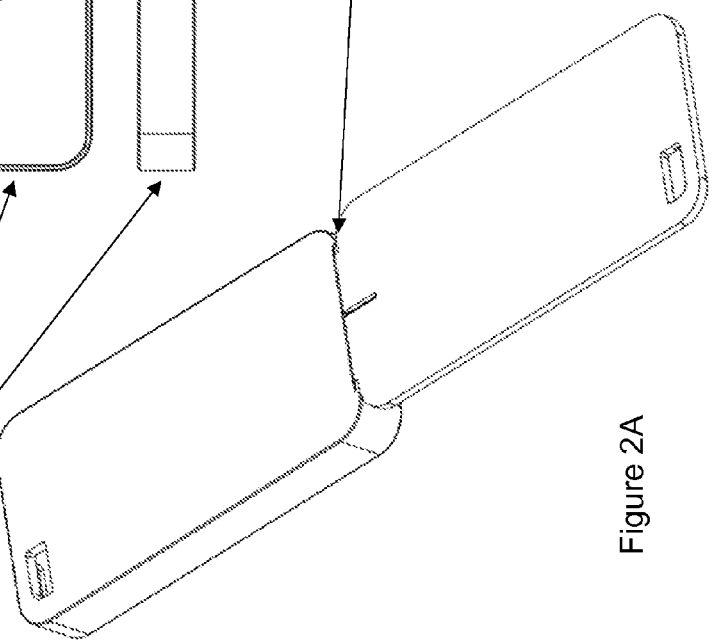

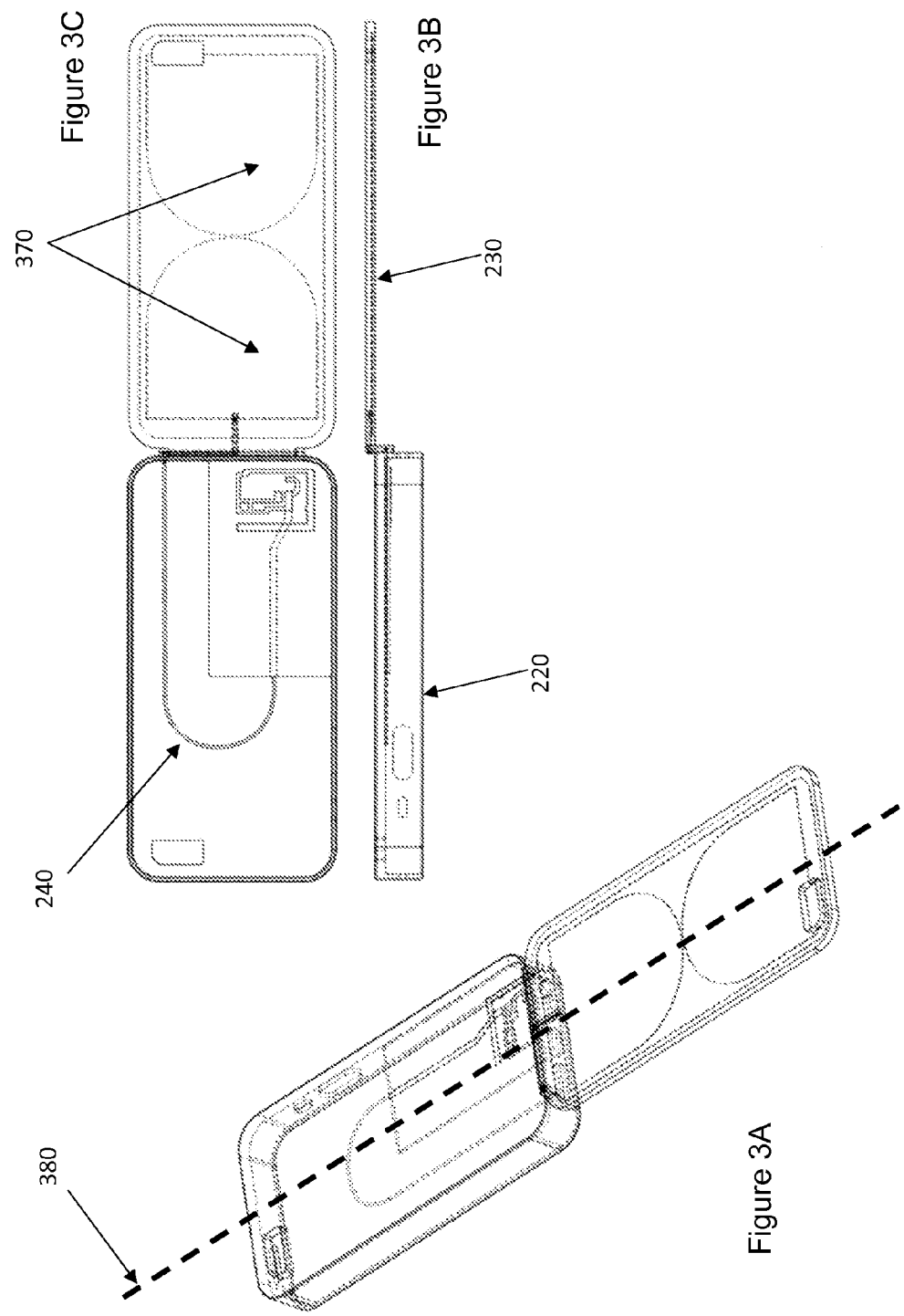

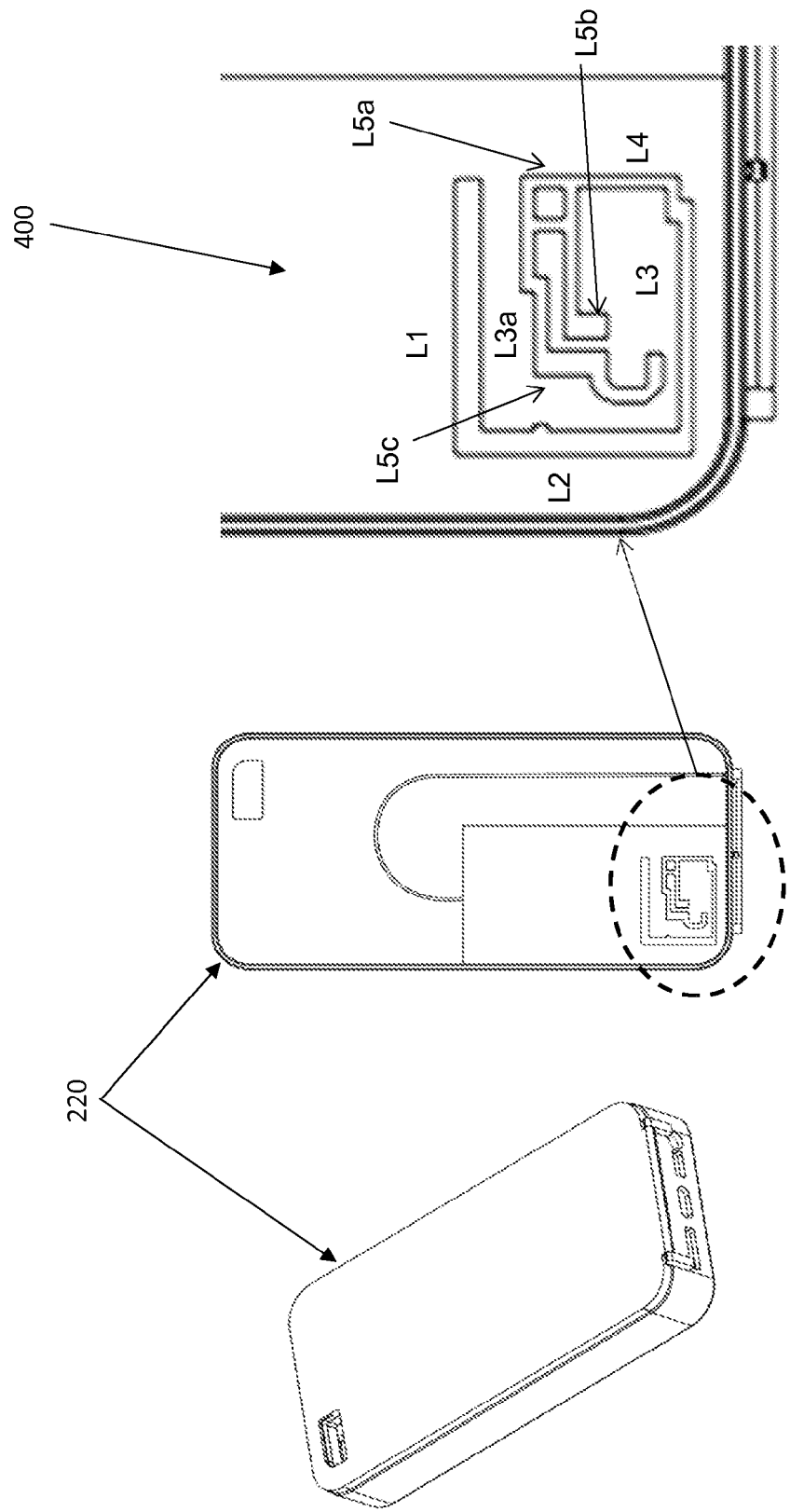

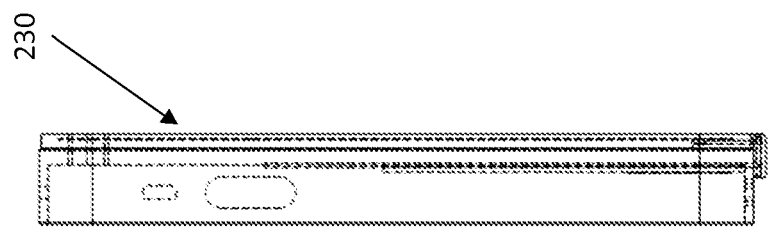
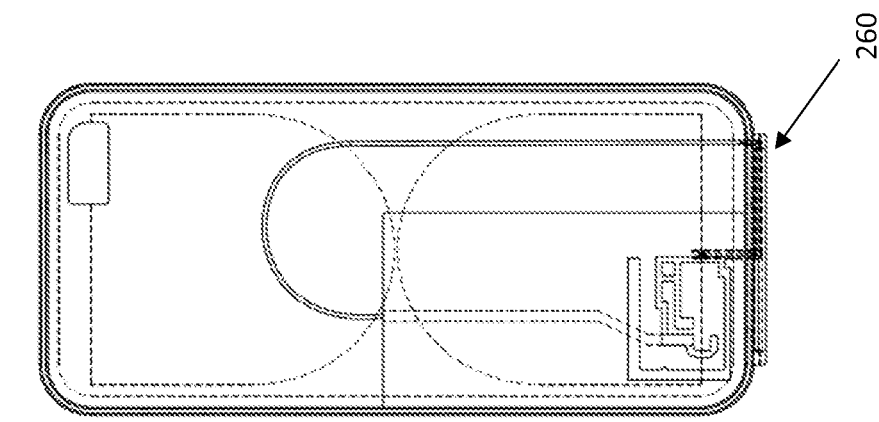
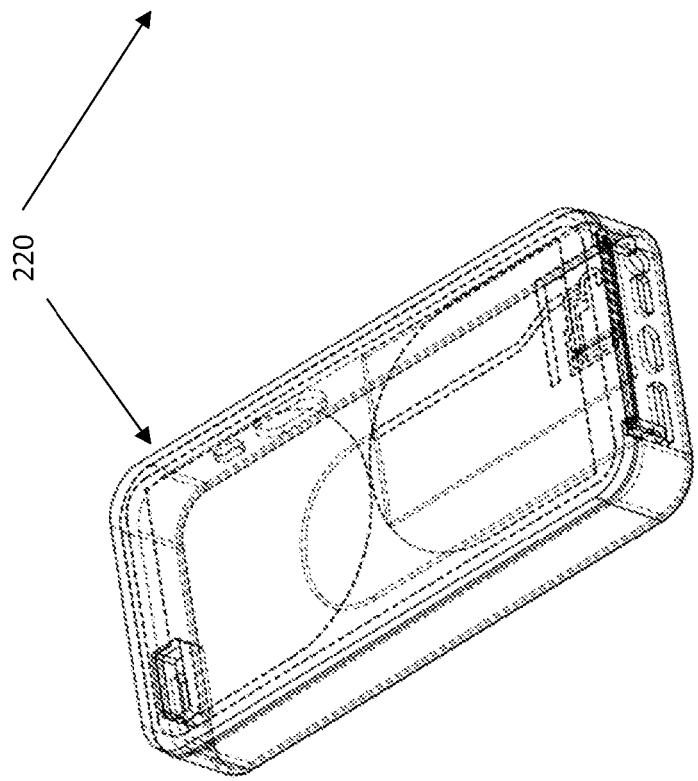
Figure 5C
Figure 5B
Figure 5A

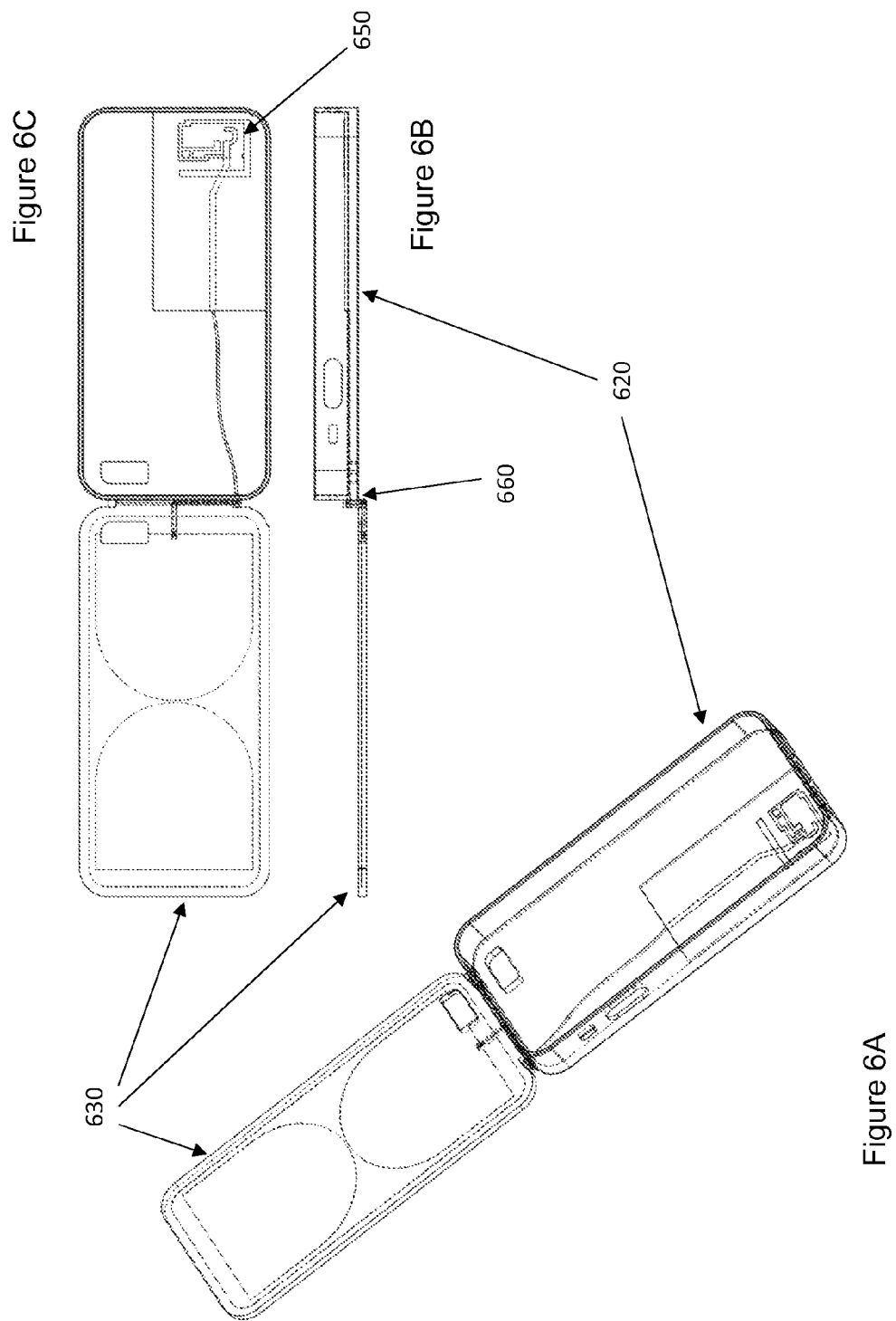

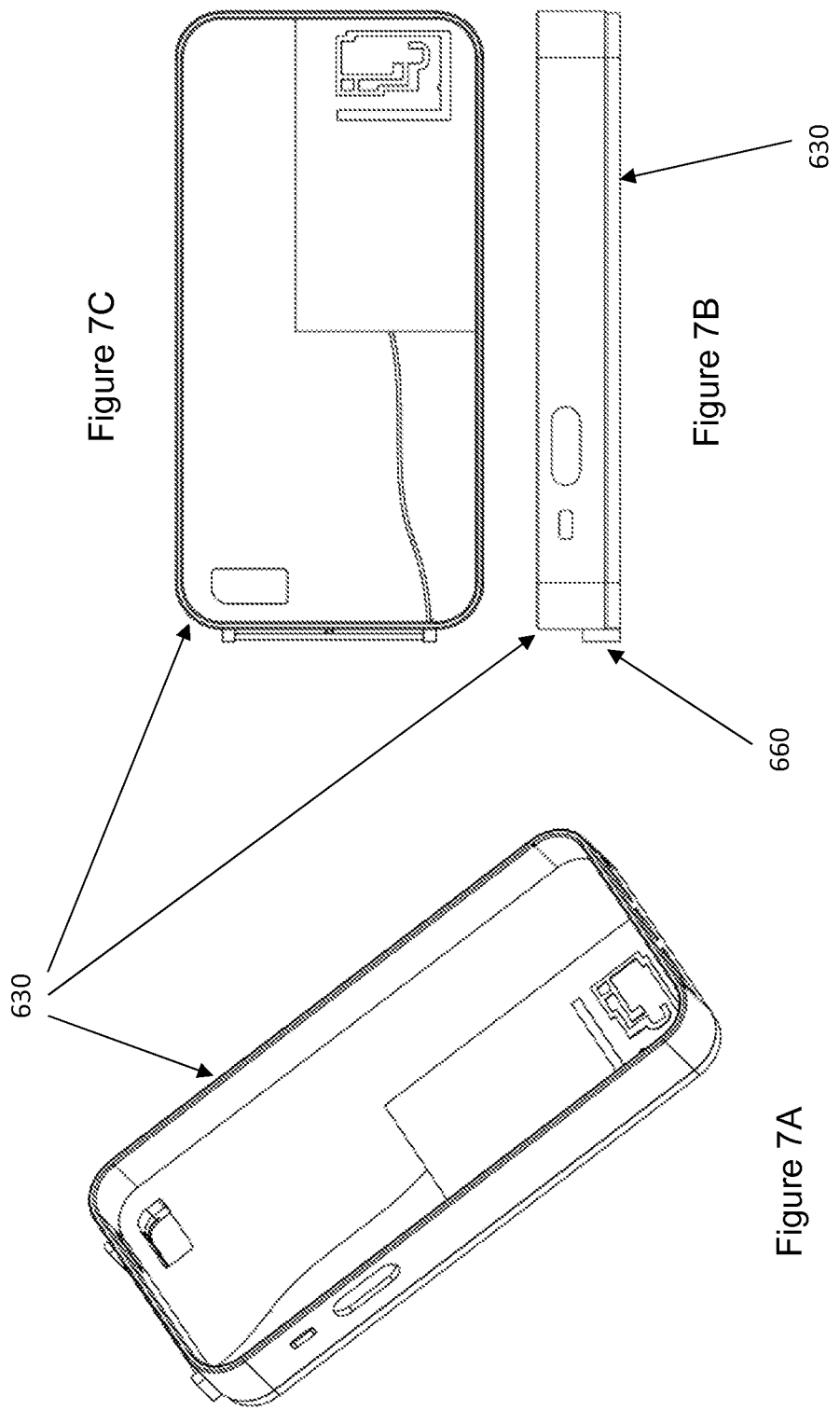

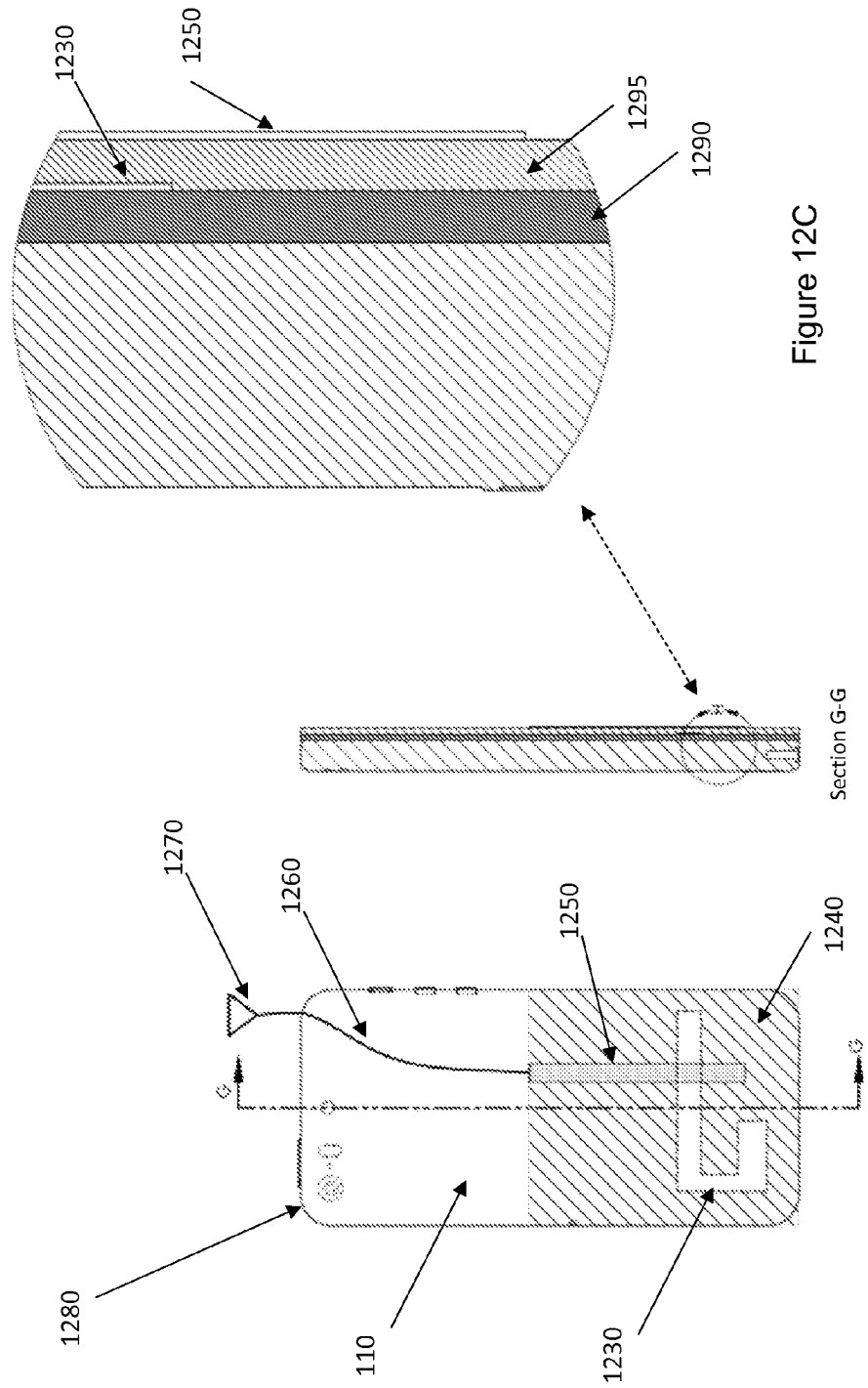

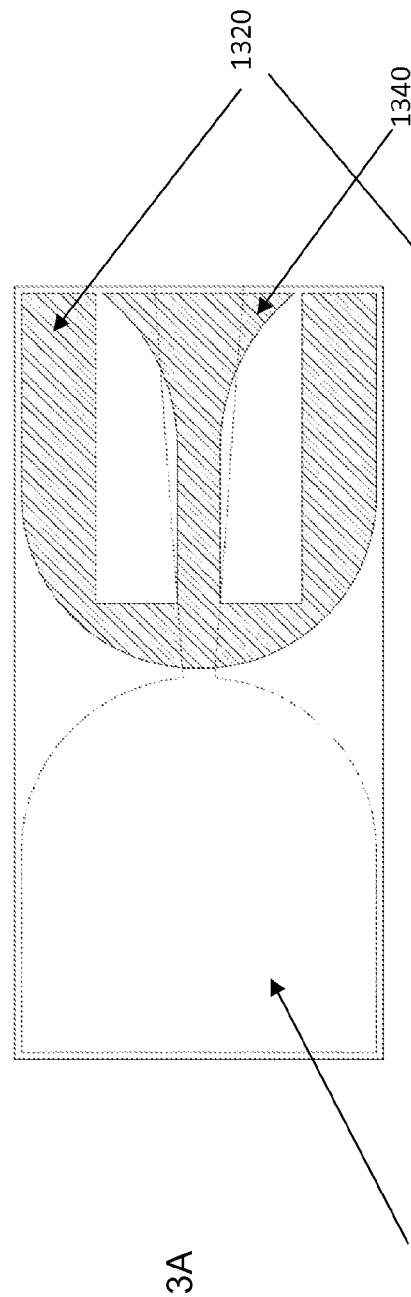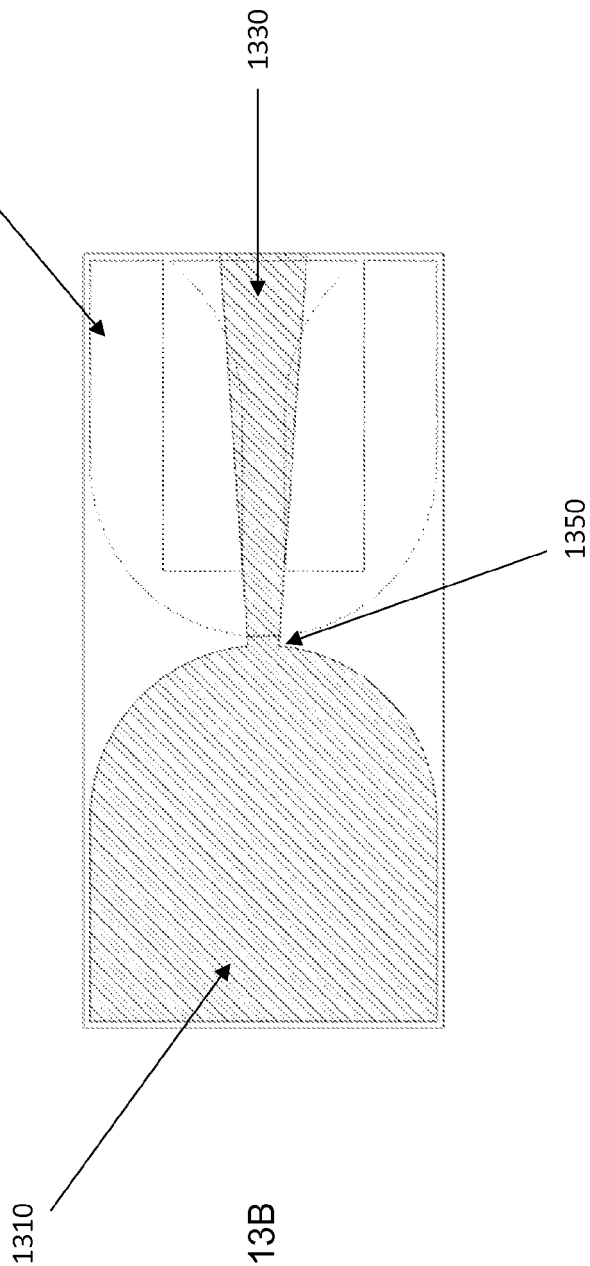
Figure 13A
Figure 13B

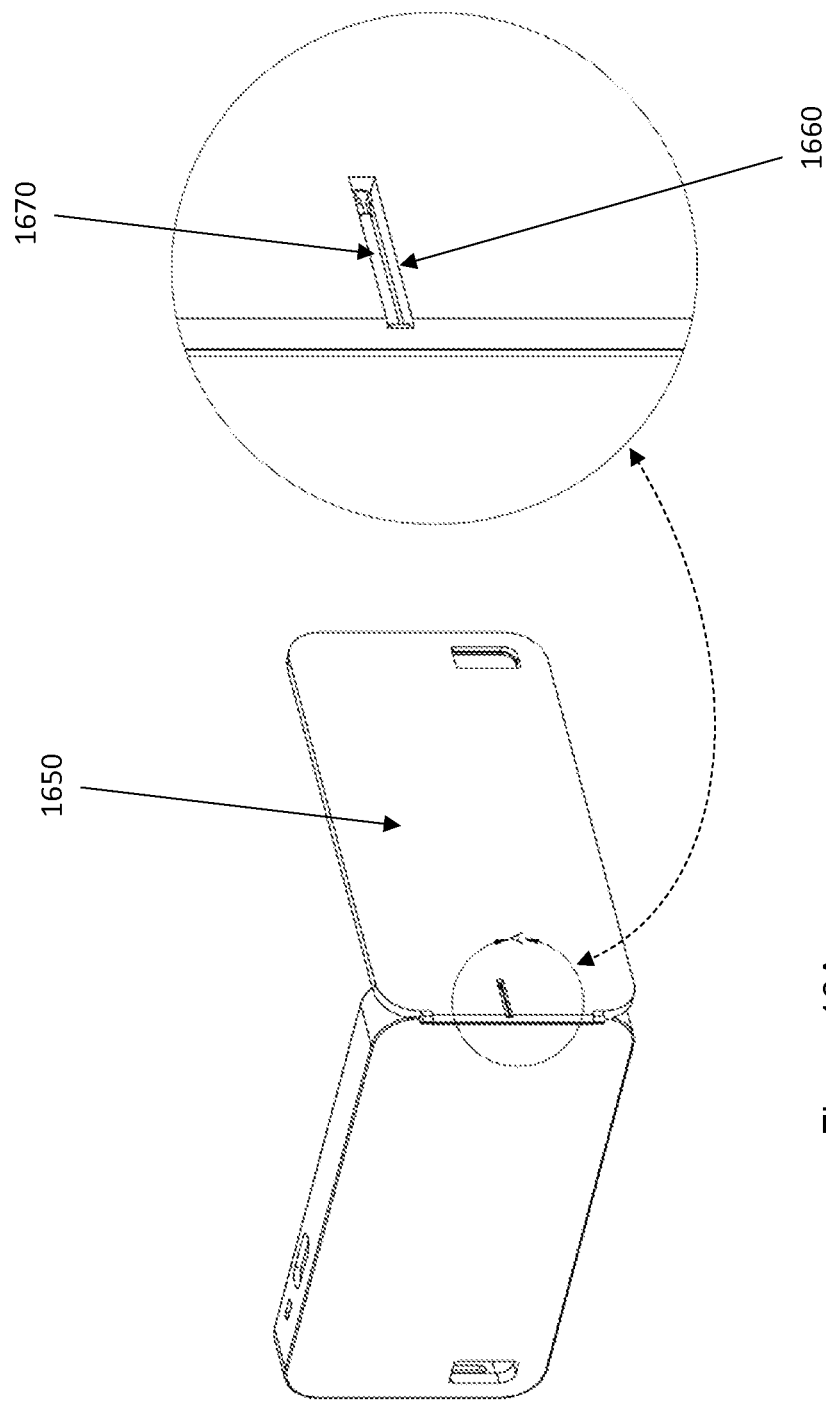

ELECTRONIC DEVICE CASE WITH ANTENNA

CROSS-REFERENCE TO RELATED APPLICATIONS

This application is a continuation of an U.S. patent application Ser. No. 14/322,027, filed Jul. 2, 2014.

FIELD

The present application relates to an electronic device case that includes an antenna.

BACKGROUND

Electronic devices are commonly used for communication and entertainment purposes. Examples of these devices include cellular phones, smartphones, tablet computers, audio players, video players, cameras, portable computers, two-way radios, GPS receivers, other electronic devices, or combinations thereof. Many of these devices communicate with other devices or systems using wireless communication. As the reliance upon these types of electronic devices increases, the reliance upon wireless communication also increases. In addition, there is an increasing need to protect these devices from damage, particularly with respect to mobile electronic devices which are often even more susceptible to being damaged, being dropped, being exposed to wet or dirty operating environments, and/or being exposed to damaging weather conditions.

Electronic devices also tend to become smaller over time, yet often perform more functions and/or increasingly complex functions. Some of these functions require transmission and reception of wireless signals including voice information, data signals, and/or navigation information. Examples of voice and data signals may include 2G, 3G, and/or 4G signals such as GSM, CDMA, UMTS/W-CDMA, 1x-RTT, EVDO, or LTE modulated signals, and/or other types of signals. These signals may also include WiFi or Bluetooth signals. Examples of navigation signals may include global positioning satellite (GPS) data. In many situations, electronic devices are mobile communication devices used to communicate data to/from a cellular base station.

The antennas an electronic device uses to transmit and receive signals must support a broad range of frequencies (e.g., have sufficient bandwidth) yet remain embedded, conformal, and/or predominantly internal to the electronic device. There are often significant limitations placed on the amount of physical volume an internal or native electronic device antenna can occupy in the electronic device. However, antennas generally need more volume to support more bandwidth efficiently.

The volume and location limitations placed on internal or native antennas in compact electronic devices often results in lower efficiency, lower gain, and/or reduced instantaneous bandwidth. One or more of these factors results in weaker signals delivered to the electronic device receive circuitry from the antenna and/or weaker signals radiated by the antenna to a receiving device. The result to some end users is phone calls of poor quality, dropped calls, lower data transfer rates, lower battery life due to increase transmit power, and/or reduced transmission distances. Further, multipath effects, fades, and/or shadowing from a cellular base station can have a more pronounced effect on electronic devices with volume restricted antennas. While techniques such as active tuning can be employed to overcome some of these limitations, it is often done so at the expense of complexity, additional circuitry, and/or higher component cost.

For many electronic device users, the restrictions placed on antennas do not observably or noticeably impact the quality of service due to their proximity to a cellular base station or other communication node. For some users who live, work, and/or travel further from cellular base stations, or who have cellular service with a service provider with a more sparsely-populated cellular tower network, the result may be more frequently dropped calls, decreased call quality, slower data transfer speeds, reduced device battery life, and/or a generally lower quality of service. Many of these users would greatly benefit from a device that overcomes some or all of the limitations of the volume-restricted antennas found inside many electronic devices, mobile electronic devices, mobile computing devices, mobile phones, cellular phones, and/or smartphones.

Further compounding the volume restrictions placed on electronic devices is the detuning and attenuation effects of a user's hands and/or head that may be near the electronic device. Measurements made using a Cellular Telecommunication Industry Association (CTIA) certifiable over-the-air (OTA) cellular range confirm that many mobile electronic devices exhibit near omnidirectional radiation in the azimuth plane (the plane with an axis parallel to the long axis of the mobile device) when in free-space (not held by or attached to a user). However, when held by a user, radiation from the devices becomes markedly directional (and of lower overall efficiency) due to interactions with the user's body.

Some mobile electronic devices are designed to accommodate a majority of users holding the device in their right hand. This accommodation is accomplished by placing the antenna(s) such that a right-handed user interferes with the radiated and received signal less than a left handed user. Furthermore, worldwide government regulatory agencies (e.g., the United States Federal Communications Commission (FCC)) place restrictions on the amount of power permitted to be absorbed by different parts of the human body with different surface area over periods of time. In order to accommodate these types of Specific Absorption Rate (SAR) requirements, manufacturers of devices will often reduce the output power when proximity to a user is sensed. However, these techniques may compound the signal strength and quality of service issues even further.

A common technique to overcome both body attenuation and detuning effects, as well as SAR restrictions, is to place the primary transmit antennas near the bottom of the mobile electronic device. The advantages are at least two-fold. First, the antennas are not directly against the user's head due to the typical natural spacing between the bottom of the electronic device and the user's face or jaw when conducting a voice communication using the device. Second, there is usually a small air gap between the mobile device and the user's hand due to the natural cupping effect of the hand while holding the mobile electronic device. Despite the elaborate engineering involved in the design and placement of cellular antennas for mobile devices, certain limitations on efficiency exist because of body-phone interaction, limited volume, reduced instantaneous bandwidth, and/or poor gain.

Some devices extend the range of a mobile electronic device (e.g., from the node to which it communicates) as well as simultaneously shield the user from harmful radiation. For example, some devices shroud the internal or native antenna to redirect radiation away from the user and enhance or increase the amount of energy directed toward a receiving device. Some devices include an additional antenna that is wired directly into the transmit/receive module of the electronic device and may also include the aforementioned shroud to direct energy away from the user. Some devices may include an add-on module to a mobile electronic device which includes a hard-wired or direct electrical connection that connects directly into the transmit/receive module of the device (e.g., into a plug or socket where the native or internal antenna would typically connect). The direct electrical connection feeds a directive antenna and reflective ground plane on the back-side of the device in order to direct radiation away from the user.

Other approaches redirect or steer energy away from the user's head through coupling to the internal or native antenna and redirecting the radiation in a direction that is generally away from the user. In general, the coupling to the internal antenna may be through parasitic means. These devices then parasitically couple to a set of radiation directors or redirectors, and finally to a re-radiation antenna inside the mobile electronic device. While the net result of these solutions may be to reduce radiation direction toward the user, the serial losses which arise from multiple parasitic couplings yields a significant net loss in transmitted power. Even a well-designed and well-tuned parasitic coupler can suffer from greater than 2 decibels of loss, which may represent a loss of over 30% of the signal energy in some cases. Each coupling stage is susceptible to losses of this magnitude which can result in significant overall signal strength degradations.

A user of a mobile electronic device may be walking, driving, or otherwise moving with respect to one or more base stations or nodes the device is communicating with. The user often has no knowledge of the location of the base station or node with respect to his or her position. The user often has no facility or resources to aim or orient the mobile electronic device relative to the base station in a manner to improve the communications. When using a device that redirects the energy of the mobile electronic device, the orientation of the user and/or the electronic device may become even more critical because the energy radiated in some directions has been intentionally reduced and/or the overall energy in all directions may have been reduced significantly. Energy that is redirected away from the user toward the backplane of the device represents a dearth of energy toward a base station that could, with equal probability, be disposed at any direction azimuthally with respect to the user (that is, in the plane whose vertical axis is coincident with the vertical axis of the user). Since energy is being diverted away from a significant portion of the spherical volume around the electronic device, the statistical net result of this approach is that for a randomly oriented user, dropped calls can statistically occur with significantly higher probability.

It is well known to those skilled in the art that the power density as a function of angle with respect to a mobile device is highly perturbed and modified when the device is held by a user in the hand or in the hand and next to the head. (M. Pelosi, et al, "Antenna Proximity Effects for Talk and Data Modes in Mobile Phones," *IEEE Antennas and Propagation Magazine*, 52, 3, June 2010; J. Toftgard, et al, "Effects on Portable Antennas of the Presence of a Person," *IEEE Transactions on Antennas and Propagation*, AP-41, 6, June 1993; J. Krogerus, et al, "Effect of the Human Body on Total Radiated Power and the 3-D Radiation Pattern of Mobile Handsets," *IEEE Transactions on Instrumentation and Measurement*", IMS-56, December 2007. In other words, the Total Radiated Power (TRP) and Total Isotropic Sensitivity (TIS) antenna pattern of a mobile device, which are exclusively and largely (respectively) functions of the antenna pattern, are dramatically perturbed through detuning and absorption based on interaction with the human body. It has been shown that over 11 decibels of net loss may occur through both detuning and absorption when a user holds a mobile electronic device, meaning that in some cases as much as 90% of the power transmitted by the mobile electronic device may be lost.

Therefore, apparatuses, techniques, systems, and methods are introduced herein to improve signal strength for an electronic device and enhance the quality of service for a user of the electronic device by enhancing the wireless signal strength delivered to/from the electronic device through its native or internal antennas. Quality of service enhancements may result in reduction of dropped calls, range extension to a node, increases in data transfer rate to/from the device, lower battery drain to achieve a threshold level of service, higher power density level delivered to the RF processing circuitry of the electronic device while the device is in receive mode, and/or higher power density transmitted to a receiving node when the electronic device is in transmit mode.

The apparatuses, techniques, systems, and methods introduced herein may improve quality of service while also preserving or enhancing the performance of an electronic device by preserving some or all of the omni-directionality in the energy transmitted from and received by the electronic device even while being held by the user and/or placed next to the head. This may be achieved while also meeting FCC and/or other governmental regulatory limits on SAR.

SUMMARY

A case for a mobile electronic device is provided. The case includes a shell, a case antenna, a transmission line, and a near-field coupling device. The shell encases at least a portion of the mobile electronic device. The case antenna is attached to the shell. The transmission line is also attached to the shell and electrically interconnects to the case antenna. The near-field coupling device has a feed port electrically interconnected to the transmission line and is configured to near-field couple to a native antenna of the mobile electronic device to capture an electromagnetic signal generated by the native antenna of the mobile electronic device. The near-field coupling device is also configured to conduct the captured electromagnetic signal from the feed port of the near-field coupling device to the case antenna through the transmission line.

In another example, a system for improving radio frequency (RF) signal quality for a mobile electronic device is provided. The system includes a protective case for the mobile electronic device and a set of non-transitory computer-executable instructions downloadable to the mobile electronic device from a computer server over a network. The protective case includes a shell to receive the mobile electronic device, a positional supplementary antenna attached to the shell, a two-conductor transmission line electrically interconnected to the supplementary antenna, and a near-field coupler having a feed port. The near-field coupler wirelessly receives an RF signal from an internal antenna of the mobile electronic device by near-field coupling to the internal antenna of the mobile electronic device. The near-field coupler also conducts the received signal from the feed port to the supplementary antenna through the two-conductor transmission line. The set of non-transitory computer-executable instructions are executable by a computer processor of the mobile electronic device to direct the mobile electronic device to determine a location of the mobile electronic device, determine a preferred pointing direction for the positional supplementary antenna based on the determined location, and indicate the preferred pointing direction on a display of the mobile electronic device.

In yet another example, a method of improving signal quality for a smartphone using an encasement for the smartphone is provided. The encasement has a near-field coupler, a supplementary antenna, and an electrical transmission line electrically interconnecting the near-field coupler and the supplementary antenna. The method includes wirelessly capturing a signal electromagnetically radiated by an internal antenna of the smartphone using the near-field coupling device. The near-field coupling device is positioned in proximity to the internal antenna of the smartphone by the encasement to near-field couple to the internal antenna of the smartphone to receive the signal radiated by the internal antenna of the smartphone. The method also includes transmitting the captured signal by conducting the captured signal from a feed port of the near-field coupling device through the transmission line to the supplementary antenna of the encasement.

The apparatuses, techniques, systems, and methods introduced herein resolve one or more of the problems associated with prior methods and solutions by coupling energy away from the internal or native antenna of a mobile electronic device with improved efficiency. Even though the wireless coupling to the native antenna may incur some energy loss, conducting the energy with a transmission line to an antenna that maintains omni-directional, or near omni-directional performance, even when held in the hand and/or near the head by a user, may be beneficial. The efficiency with which energy is coupled from the native antenna and delivered to a case antenna is of significant importance for a case, encasement, apparatus, or device whose purpose is to enhance cellular signal strength delivered to/from the electronic device. The few decibels of initial coupling loss to the antenna may be minor compared to the overall performance enhancements achieved by an antenna that is less affected by a user's head or hand.

The coupling method utilized in the apparatuses, techniques, systems, and methods introduced herein is a general class of electromagnetic coupling mechanisms often referred to as near-field coupling. This coupling method is not to be confused with the similarly named communications protocol called Near Field Communications (NFC). Although the latter relies on signal transfer using a type of near-field coupling, it does so using purely a low frequency tuned magnetic coil inductive coupling approach.

BRIEF DESCRIPTION OF THE DRAWINGS

The apparatuses, techniques, systems, and methods disclosed herein will be described and explained through the use of the accompanying drawings in which:

FIG. 1A illustrates a front view of an electronic device installed in a case;

FIG. 1B illustrates a side view of an electronic device installed in a case;

FIG. 1C illustrates a perspective view of an electronic device installed in a case;

FIG. 2A illustrates a perspective view of a case for an electronic device, the case having a hinged antenna near a bottom of the case;

FIG. 2B illustrates a side view of a case for an electronic device;

FIG. 2C illustrates a front view of a case for an electronic device;

FIG. 3A illustrates a perspective view of a case for an electronic device, the case having a hinged antenna near a bottom of the case;

FIG. 3B illustrates a cross-sectional view of a case for an electronic device;

FIG. 3C illustrates a front view of a case for an electronic device;

FIG. 4A illustrates a perspective view of a case having a coupling circuit;

FIG. 4B illustrates a front view of a case having a coupling circuit;

FIG. 4C illustrates an exploded view of the coupling circuit of FIG. 4B;

FIG. 5A illustrates a perspective view of a case for an electronic device, the case having an antenna in a closed or stowed position;

FIG. 5B illustrates a front view of a case for an electronic device;

FIG. 5C illustrates a side view of a case for an electronic device;

FIG. 6A illustrates a perspective view of a case for an electronic device, the case having a hinged antenna near a top of the case;

FIG. 6B illustrates a side view of a case for an electronic device;

FIG. 6C illustrates a front view of a case for an electronic device;

FIG. 7A illustrates a perspective view of a case for an electronic device, the case having an antenna in a closed or stowed position;

FIG. 7B illustrates a side view of a case for an electronic device;

FIG. 7C illustrates a front view of a case for an electronic device;

FIG. 12A illustrates a case with a parasitic aperture coupling mechanism;

FIG. 12B illustrates a side view of the case of FIG. 12A;

FIG. 12C illustrates an exploded view of the case of FIG. 12C;

FIG. 13A illustrates a first view of a planar wideband flared dipole antenna fed with a Dyson microstrip-to-twinlead balun;

FIG. 13B illustrates a second view of a planar wideband flared dipole antenna fed with a Dyson microstrip-to-twinlead balun;

FIG. 16A illustrates a coaxial cable connected to a planar case antenna; and

FIG. 16B illustrates an exploded view of the assembly of FIG. 16A.

DETAILED DESCRIPTION

Figure 8:
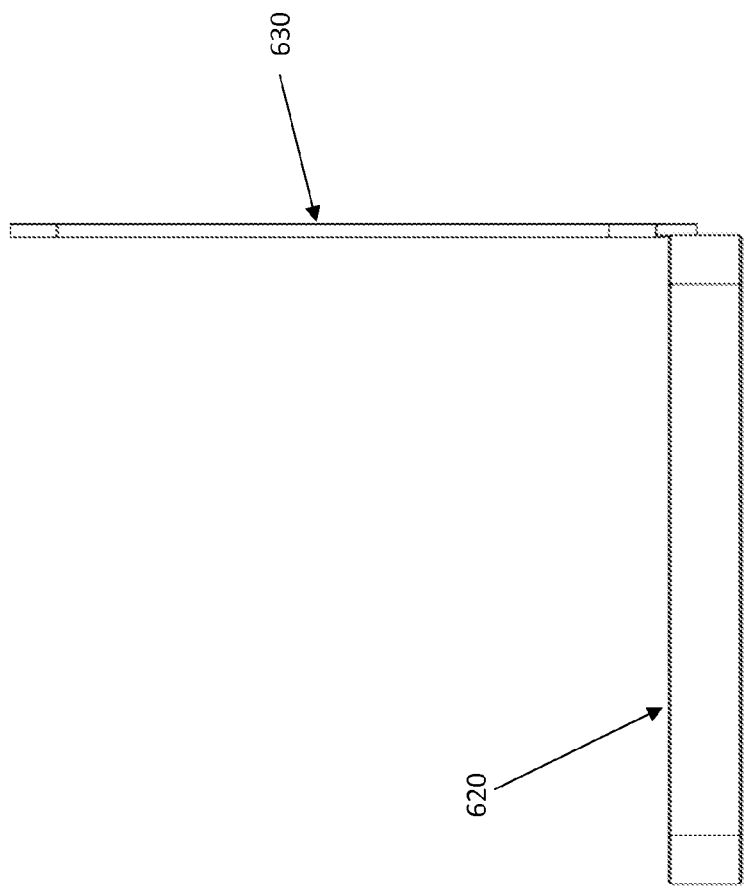
FIG. 8 illustrates a case having an antenna oriented in a preferred position.

In the following detailed description, various specific details are set forth in order to provide an understanding of and describe the apparatuses, techniques, systems, and methods introduced here. However, the apparatuses, techniques, systems, and methods may be practiced without the specific details set forth in these examples. Various alternatives, modifications, and/or equivalents will be apparent to those skilled in the art without varying from the spirit of the introduced apparatuses, techniques, systems, and methods. For example, while the examples described herein refer to particular features, the scope of this solution also includes techniques and implementations having different combinations of features and embodiments that do not include all of the described features. Accordingly, the scope of the apparatuses, techniques, systems, and methods introduced herein are intended to embrace all such alternatives, modifications, and variations as fall within the scope of the claims, together with all equivalents thereof. Therefore, the description should not be taken as limiting the scope of the invention, which is defined by the claims.

Electronic, communication, and computing devices have become increasingly popular. Many of these devices communicate with other devices or systems that transmit and/or receive wireless radio frequency (RF) communication signals. Wireless communication typically requires use of an antenna. In recent years, an increasing number of these electronic and communication devices conduct wireless communication using one or more antennas that are internal to the electronic device. While internal antennas are efficient and attractive from a volume and packaging standpoint, they may provide less than ideal performance in some circumstances. Sometimes, a user may have difficulty using his or her electronic device due to the RF communication signals being weak, faint, distant, interfered with, noisy, directed in a non-preferred direction, subject to absorption, subject to reflections, subject to multipath effects, or a combination thereof.

Improved performance can be achieved by converting the native or internal antenna of an electronic device into a driver or feed for a larger, differently placed, differently oriented, more efficient, and/or broader frequency band antenna that is external to the electronic device. In some configurations, the external antenna may be contained inside a deployable mechanism, such as a flip-out antenna, which a user could engage when he or she is in an area of disadvantaged signal strength or wants to change the transmission/reception characteristics for some other reason. The external antenna could be beneficial in providing a boost in signal strength for one or more of the reasons discussed herein.

In addition to having a larger effective aperture or energy capture area, the external antenna may be broader band than the native antenna. For example, the native antenna of a cellular phone typically covers a fairly wide set of frequencies for 2G and 3G voice and data coverage, and sometimes 4G as well. A particular frequency band or channel is often assigned to the cellular phone at the time a call is initiated. While the native antenna may be tuned to the center of the cellular uplink and/or downlink band(s), it often experiences degradation near the edge(s) of those bands. The external or case antenna may not experience this dramatic roll-off at the band edges and may provide service at band-edge frequencies with similar, or nearly similar, performance as at the band-center.

In addition, the radiation point of the external antenna, also known as the "phase center" or the physical point in space from which electromagnetic energy is said to radiate from the antenna, may be physically lower with respect to the user's head and/or hands. In one example of a cellular phone, the phase center associated with the external antenna may be lower by about 1 inch to 3 inches. This may also have a positive effect on the performance of the case antenna compared to the native antenna. The native antenna may be impacted in at least two ways by the user's hand or body. First, energy is absorbed directly by the hand or body and any absorption reduces the available power transmitted to the cellular tower. Second, the hand or body may have an impedance detuning effect on the antenna. The limited volume allocated for the native antenna naturally limits the tuning bandwidth of the antenna and the detuning effect of the hand or body compounds this effect. Moving the antenna further away from the head, hand, and/or body reduces the adverse detuning and/or absorption/blockage effect.

In addition to desiring reliable wireless communications, many users may also wish to protect their electronic device with a case, cover, and/or encasement that reduces risk of damage to the electronic device. Protecting an electronic device may include protecting it from shock, impact, breakage, dropping, scratching, puncture, water, snow, dust, dirt, and/or other damaging forces or elements.

FIG. 1A illustrates a front view of a case 120 for electronic device 110. Electronic device 110 may be a cellular phone, a smartphone, a tablet computer, a notebook computer, a camera, a global positioning system (GPS) receiver, a video player, an audio player, an electronic book reading device, a two-way radio, or a combination thereof. Case 120 provides protection to electronic device 110. Protection may include protection from shock, impact, breakage, dropping, scratching, puncture, water, snow, dust, dirt, and/or other damaging forces or elements. Case 120 may protect various parts of electronic device 110 including protecting a display, a side, a back, an interface, a connector, and/or another part or component of electronic device 110, including combinations thereof. Case 120 may be composed of one or more shell components that encase some or all of electronic device 110. Case 120 may have a front aperture or window through which an interface or touch screen of electronic device 110 is accessed. In some configurations, the aperture may be covered with a thin film or membrane that allows the user to interact with the touch screen through the membrane. In some configurations, the case may be water resistant or water proof to protect electronic device 110 from liquids.

Many different types of cases and covers are possible and the apparatuses, techniques, systems, and methods disclosed herein should not be limited to any particular type of case or to a case having any particular structural design or feature. In one example, case 120 protects only the front and one or more sides of electronic device 110. In another example, case 120 protects only one side of electronic device 110. In yet another example, case 120 protects only a display screen of electronic device 110. Case 120 may be made from a variety of materials including plastic, silicone, leather, cloth, metal, ceramic, metalized ceramic, polymer, elastomer, or a combination thereof.

The wireless communication capabilities of electronic device 110 may include one or more of: cellular, RF, Wireless Fidelity (WiFi), Bluetooth, Near Field Communication (NFC), 2G, 3G, GSM, CDMA, 4G, LTE, other formats of wireless communication, and/or combinations thereof. Wireless communication signals are typically transmitted and/or received by electronic device 110 using one or more antennas. An antenna is any device that converts guided electrical power into free-space radiating waves and/or converts free-space radiating waves into guided electrical power. Electronic device 110 may have one or more externally visible antennas for performing communications. However, in many cases, one or more antennas may be internal to electronic device 110.

The wireless communication signals transmitted and/or received by electronic device 110 may be weak or faint due to the distance from which they were sent, due to power limitations, due to antenna inefficiencies, and/or for other reasons. In addition, wireless communication signals may be subject to noise, interference, reflections, absorption, multipath effects, fading, or a combination thereof. Wireless communications in a mobile electronic device may be improved by using a supplemental antenna. As compared to an internal antenna of electronic device 110, a supplemental antenna may be larger, may be more efficient, may include amplification, may be better tuned to certain conditions, may be directional, may be omnidirectional, may be adjustable, may have an antenna pattern better suited for the circumstances, may have more preferred antenna characteristics, and/or may be positionable relative to electronic device 110.

FIG. 1B illustrates a side view of electronic device 110 installed in case 120. FIG. 1C illustrates a perspective view of electronic device 110 installed in case 120.

FIGS. 2A, 2B, and 2C illustrate various views of a case 220 for an electronic device. FIG. 2A illustrates a perspective view of case 220, FIG. 2B illustrates a side view of case 220, and FIG. 2C illustrates a front view of case 220. Case 220 is an example of case 120. Case 220 includes shell 290, antenna assembly 230, transmission line feed 240, parasitic coupling circuit 250, and hinging joint 260. Antenna assembly 230 includes an antenna. Hinging joint 260 attaches antenna assembly 230 to case 220 near the bottom of case 220 and permits antenna assembly 230 to pivot from a stowed position to an open position. Hinging joint 260 comprises any mechanical component that permits an antenna assembly attached to case 220 to move with respect to case 220 while remaining attached, permanently or semi-permanently, to case 220. Shell 290 encases at least a portion of a mobile electronic device. Shell 290 may be constructed of more than one component.

Transmission line feed 240 electrically interconnects coupling circuit 250 to antenna assembly 230. Transmission line feed 240 may include one or more of: a microstrip (e.g., two conductors formed by the driven signal trace and the ground plane), a twinlead, a stripline (e.g., upper and lower ground traces considered a single reference trace), a coaxial line (e.g., a center conductor and outer conductor), a coaxial cable, and/or a co-planar waveguide (e.g., two planar conductors separated by a small gap). Parasitic coupling circuit 250 is configured to parasitically couple to a native antenna of a mobile electronic device inside case 220 to capture an electromagnetic signal generated by the native antenna of the mobile electronic device. Parasitic coupling circuit 250 may also be configured to conduct the captured electromagnetic signal from the feed port of parasitic coupling circuit 250 to the antenna of antenna assembly 230 through transmission line feed 240.

In the examples of FIGS. 2A-2C, antenna assembly 230 pivots out from case 220 and can be placed in a plurality of positions relative to case 220 and/or relative to an electronic device inside case 220. In some situations, wireless signal strength and/or wireless signal quality for an electronic device inside case 220 may be improved by changing a position and/or angle of antenna assembly 230 relative to other electronic device(s) the electronic device is attempting to communicate with. Using a fixed position or native antenna (s) typically requires changing the position and/or angle of the entire electronic device to change the position or orientation of the antenna. This may be inconvenient for the user and/or the user may not be aware of a better direction for the antenna. In some situations, the user may be using the electronic device for a voice call. In other situations, the user may be using a keyboard or touchscreen of the electronic device while it is held in his or her hand, laying on a table, or positioned in a stand or holder. In these and other situations, it may be difficult, inconvenient, or impossible to change the position of the electronic device to attempt to improve the signal quality and/or signal strength.

FIGS. 3A, 3B, and 3C illustrate various cutaway views of case 220 of FIGS. 2A-2C. FIG. 3C illustrates antenna 370 inside antenna assembly 230. Antenna 370 comprises a conductor and is illustrated as a wideband planar flared dipole. However, those skilled in the art will appreciate that many other antenna and/or antenna conductor geometries are possible including, for example, monopoles, patches, planar inverted f antennas (PIFAs), and the like. A planar wideband dipole has at least two distinct advantages over other antenna styles. First, it may have an omnidirectional radiation pattern in the plane whose axis is defined by line 380. Second, using proper feed techniques known to those skilled in the art as a balun, including that class of planar baluns known as a Dyson balun, the radiating fields of antenna 370 can be partially or fully isolated from the other parts of case 220 and/or from an electronic device inside case 220. The net effect is to reduce or eliminate frequency detuning of antenna 370 and attenuation/absorption of its attendant radiated fields due to interaction with a user holding the device.

Because case 220 may be designed, manufactured, and/or purchased independently of an electronic device used with case 220, case 220 may not have a direct electrical connection through which to interface antenna 370 to the native antenna of the electronic device. In many situations, the native antenna of the electronic device may be internal such that it is not externally physically accessible and/or the electronic device may not contain an external port or connector to attach to the native antenna or to a signal associated with the internal antenna. Therefore, case 220 may wirelessly couple, parasitically couple, and/or near-field couple to the native antenna of the electronic device using a circuit, such as parasitic coupling circuit 250. The term 'inductive coupling' may sometimes also be used to describe this coupling technique. However, induction is only one form of near-field wireless energy transfer and is often most relevant to electrically small antennas or to those situations where purely magnetic-field interactions dominate. Capacitive coupling is the complement to inductive coupling. From the standpoint of the end user, antenna 370 may be coupled to the native antenna simply by installing case 220 onto an electronic device. However, in some situations, a connector associated with case 220, antenna assembly 230, and/or antenna 370 may plug into an RF connector or port of an electronic device to make a direct electrical connection to circuitry of the electronic device.

In one implementation of the techniques disclosed herein, parasitic coupling circuit 250 may include a near-field coupling device. The near-field coupling device couples RF signals from the internal antenna of the electronic device by means of near-field coupling. The near-field is governed by reactive fields, which are described as those with polarization vectors not necessarily perpendicular to the direction of power flow, and power density which decreases with the third, fourth and higher geometric powers of distance. The far field region is the region in which fields have typical radiating electromagnetic behaviors defined as having an electric field polarized in a certain direction which is perpendicular to the direction of power flow, and a magnetic field which is perpendicular to both the electric field and the direction of power flow. Electromagnetic energy in the far field therefore is described by an electric field vector, a magnetic field vector, and a vector in the direction of power flow which are all three mutually perpendicular. The density of power decreases with the square of the distance from the radiation phase center. The boundary between the far field and the near-field depends on the dominant wavelength emitted by the source.

A near-field coupling device, or near-field coupler such as parasitic coupling circuit 250, may match, or nearly match, the near-field impedance of free space at a close proximity to the electronic device's internal antenna(s) at one or more RF frequency bands of interest. Positioned appropriately, the near-field coupler presents a near-field impedance match, or near match, to the internal antenna to facilitate effective coupling of RF signals between the transmission Line and the internal antenna. The near-field coupling mechanism may be considered capacitive coupling, inductive coupling, or a combination of the two depending on the type of internal antenna(s) the electronic device employs.

The near-field coupler and/or other components may be selected or configured for optimal performance over a multitude of RF frequency bands, such as cellular, LTE, WiFi, Bluetooth, or any RF frequency bands on which the electronic device is designed to transmit or receive signals. In some examples, case 220 may have multiple antennas each optimized for a different frequency band. In other examples, variations of case 220 may each have an antenna optimized for one or more frequency bands which are a subset of the frequency bands associated with the internal antenna(s) of the electronic device to which they are coupled.

When the near-field coupler is partially or fully near-field impedance matched to the internal antenna of the electronic device, the internal antenna of the electronic device may no longer radiate as effectively into free space as originally designed or intended. The near-field coupling mechanism reduces the amount of energy normally radiated by the internal antenna in the uncoupled state by approximately the same amount of energy as is coupled to the transmission line. This coupling transforms the role of the internal antenna from that of an antenna to that of a feed or near-field coupler in this configuration.

In some cases, the near-field coupler may be designed by generating a model of the electronic device/internal antenna and then generating a model of the near-field coupler which resembles or mirrors the internal antenna. The coupler design can be modified or tuned to increase coupling between the two ($S_{21}$, in S-parameter network analysis terms) and reduce reflections ($S_{11}$ in S-parameter terms). The design may be verified in a bench test by connecting one port of a Vector Network Analyzer (VNA) into the feed cable for the internal antenna and connecting the other port of the VNA to the feed cable for the coupler (which would otherwise be connected to the transmission line that feeds the external antenna). With proper design and/or tuning, $S_{ii}$ and $S_{22}$, the input impedance mismatch of each port, can be reduced, while $S_{21}$ can be increased or maximized.

Based on well-known phenomenon regarding energy transfer between two reactively-coupled structures, an ideal or preferred geometry of the coupling structure is not just one that promotes mutual resonance at similar, near, or identical frequencies, but one that promotes similar, near, or identical frequency-dependent input impedance characteristics. This is achieved by matching the input impedance versus frequency relationship of the native antenna to the input impedance versus frequency relationship of the coupling structure and its load termination which may also include a two-conductor transmission line and a re-radiation or case antenna.

Applicants have devised a process or method of designing and tuning a near-field coupler circuit which involves modeling and simulation using full-wave design tools such as HFSS. In the model, a feed port is placed at the input to the native antenna, and a second feed port is placed at the input to the coupler circuit which is disposed close to the native antenna at a spacing that approximates the thickness of the electronic device backplane plus the thickness of the protective case wall. The tuning parameters of the parasitic coupling circuit are tuned until $S_{21}$ is maximized and $S_{22}$ are both minimized. Using this technique, the measured transmission coefficient between the input port of the native antenna (when it is disconnected from the wireless communications circuitry of electronic device 110 and connected to the first port of a VNA) and the input port of the coupling circuit (when it is disconnected from a coaxial feed cable and connected to the second port of the VNA) can be as high as −2 decibels. To those skilled in the art, this level of coupling would typically be considered quite appreciable considering the energy transfer medium is wireless, through free space.

Although antenna 370 and antenna assembly 230 are described primarily with respect to their RF functions, antenna assembly 230 may also have other features. For example, antenna assembly 230 may be designed in a shape that makes it easy to grasp, move, or position. Antenna assembly 230 may be encased in plastic or another material with a shape that makes it easier to handle, easier to move, easier to see, safer, and/or more aesthetically pleasing.

In some configurations, the opening, extending, activating, and/or un-stowing of antenna assembly 230 may also provide access to some or all of an electronic device inside case 220. For example, un-stowing antenna assembly 230 may put antenna assembly 230 in a better physical position to improve wireless communications as well provide access to one or more controls of the electronic device, such as providing access to a touch screen interface of the electronic device. Antenna assembly 230 is illustrated as having a flat or paddle shape, but could have one or more other shapes.

Beneficially, antenna assembly 230 may be moved to various positions without having to move or change a position of case 220 or changing a position of an electronic device inside case 220. Antenna assembly 230 can be rotated or pivoted to another position which provides improved signal strength to and/or from the electronic device. Although antenna assembly 230 is illustrated as pivoting from case 220 in one direction, antenna assembly 230 may be movable in another direction, and/or may be positionable in two or more axes with respect to case 220. Antenna assembly 230 may provide increased signal quality and/or strength to and/or from an electronic device because it can be positioned in a more optimum direction which is more suitable for the given communication circumstances. In some situations, antenna assembly 230 may be positioned such that it is in a vertical, or partially vertical, position even though an electronic device inside case 220 may be lying horizontally, or partially horizontally. This may occur when a user has the electronic device lying on a desk and is using the touchscreen without holding the device or when the device is sitting on a table and being used as a hotspot.

Transmission line feed 240 may have sufficiently small diameter to be located in a guiding recess or channel which may be disposed between an electronic device and an inner surface of case 220. Transmission line 240 may be routed through hinging joint 260 with enough extra length such that antenna assembly 230 can rotate from a closed position (as shown in FIGS. 5A-5C) to a deployed position (as shown in FIGS. 2A-2C and 3A-3C), and/or rotate to a hotspot or tabletop position (as shown in FIG. 8).

In addition to providing signal improvements over the internal or native antenna because it is positionable, antenna 370, with its associated radiating conductor, may also have other features that provide advantages over the internal antenna(s) of the electronic device. These features may include: larger size, better efficiency, higher gain, tuning for a particular frequency or frequency range, optimization for a particular power range, an antenna pattern that is different than an antenna pattern of the internal antenna, directionality, higher quality materials, and/or amplification, where permitted by local regulations. In addition, antenna 370 may be shielded or electromagnetically obstructed by fewer materials than the internal antenna and therefore provide better gain and/or signal quality.

Antenna 370 may cover a combination of voice/cellular/data frequency bands, voice bands only, data bands only, and/or could also be configured to cover WiFi, Bluetooth, GPS, and/or another type or standard of wireless communication. Antenna assembly 230 may contain a plurality of antennas, each suited to cover a different frequency, frequency band, and/or communication protocol. Antenna 370 may also be connected to another small radio inside case 220 which receives television signals, radio signals, two-way radio signals, or a combination thereof.

FIG. 4A illustrates a perspective view of case 220. FIG. 4B illustrates a coupling circuit in case 220. FIG. 4C illustrates and exploded view of the coupling circuit. Coupling circuit 400 is based on a mirrored-antenna approach to optimizing the coupler. Coupling circuit 400 is a multi-band PIFA, which is a known and documented type of antenna used particularly in the mobile device industry. The various resonant arms of this particular design include L4-FL3-FL2-FL1 as the low frequency resonator (cellular/850 MHz), L3a-FL5c as high frequency #1 resonator (PCS/1900 MHz), and L5B as high frequency #2 resonator (AWS/2100 MHz). The circuit illustrated in FIG. 4C may be optimized using a fullwave tool, such as HFSS. It is known in the arts that multi-variable optimization procedures are often aided by pre-selecting an initial condition or initial design which may be a global or local optimum design.

The design of coupling circuit 400 may be tuned and improved by making minor adjustments to this initial condition and re-evaluating the fitness function which, in this case, is a combination of the input impedance match of the coupler and native antenna ("$S_{11}$") as well as the transmission coefficient ("$S_{21}$") between the coupler and the native antenna obtained through the modeling tool. Applicants have determined that a suitable initial condition for the coupler when using this coupling style is a close resemblance, or mirrored copy, of the native antenna geometry, separated of course by the thickness of the mobile device native outer shell and the wall thickness of the inventive protective shell. An optimized design is then obtained by tuning parameters L1, L2, L3, L3a, L4, L5a, L5b, L5c and other smaller features if needed. HFSS by ANSYS is a suitable modeling tool for these purposes, although use of other modeling tools is possible.

FIGS. 5A, 5B, and 5C illustrate various views of antenna assembly 230 of case 220 after it has been rotated into a closed or stowed position by hinging about hinging mechanism 260. Other mechanical structures or configurations for positioning, hinging, or stowing antenna 230 are possible and the apparatuses, techniques, systems, and methods disclosed herein are not to be limited to any particular mechanical structure or configuration for a case antenna or case antenna assembly. In some situations the closing or stowing of antenna assembly 230 may deactivate, disconnect, shutdown, disable, or otherwise temporarily discontinue operation of one or more components of case 220, such as coupling circuit 250.

FIGS. 6A-6C illustrate multiple views of case 620 for an electronic device. Case 620 includes features similar to case 120 and/or case 220 and includes antenna assembly 630 attached to case 620 near a top of case 620. Antenna assembly 630 is an example of antenna assembly 230. Antenna assembly 630 pivots or hinges from at or near a top of case 620 on hinging mechanism 660 when a user is using or looking at an electronic device in an upright position in case 620. Case 620 includes coupling circuit 650 which is an example of coupling circuit 250. FIGS. 7A-7C illustrate case 620 with antenna assembly 630 in a closed or stowed position.

In addition to the configurations illustrated in FIGS. 6A-6C and 7A-7C, antenna assembly 630 may be placed in other positions in between the open and closed positions, relative to case 620. For example, FIG. 8 illustrates antenna assembly 630 positioned at an angle of approximately ninety degrees relative to case 620. Other positions and angular relationships are possible. The configuration illustrated in FIG. 8 may be convenient in situations where an electronic device in case 620 is being used while case 620 is lying on a table, on another horizontal surface, or on a near-horizontal surface. The upright position, or near-upright position, of antenna assembly 630 may improve signal quality or performance as described herein. In other situations, antenna assembly may be placed in other positions relative to case 620. For example, a user may be holding case 620 in his or her hand or in a stand at an approximately forty five degree angle and antenna assembly may be positioned at an approximately 45 degrees angle relative to the body of case 620 in order for antenna assembly 630 to remain in an upright or near upright position.

Figure 9:
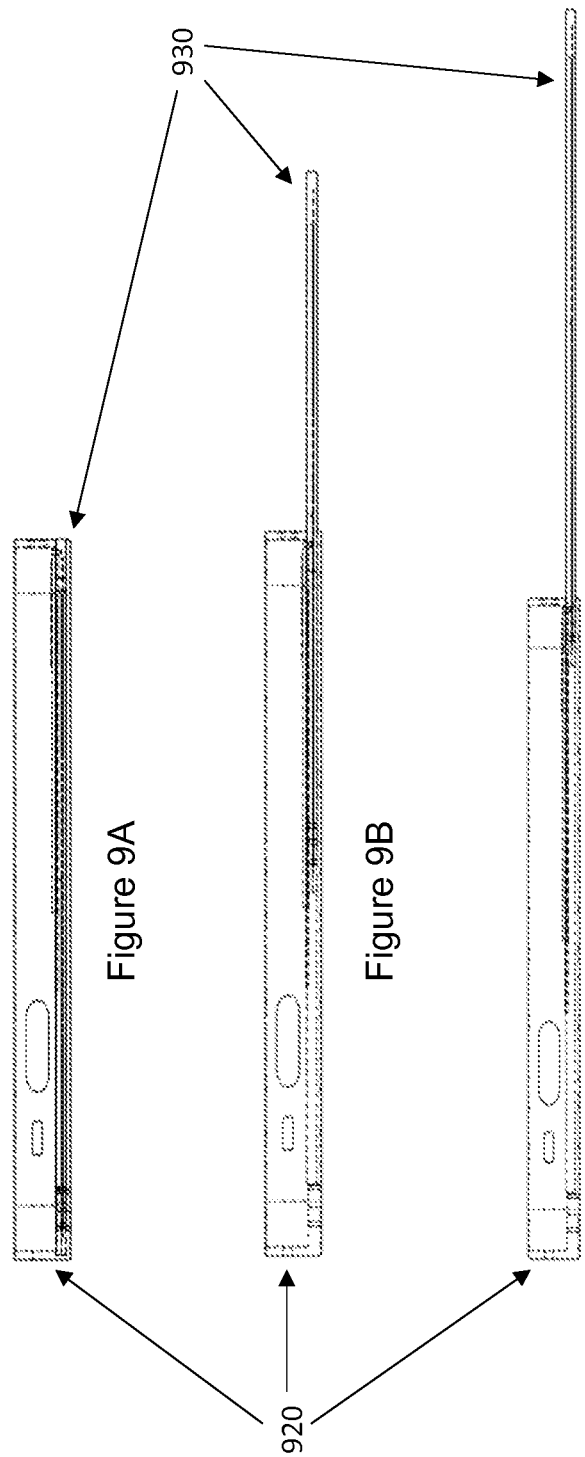
FIG. 9A illustrates a case having a slidably deployable antenna.
FIG. 9B illustrates a case having a partially deployed antenna.
FIG. 9C illustrates a case having a deployed antenna.

FIGS. 9A-9C illustrate case 920 having a slidably deployable antenna assembly 930, in various states of deployment, rather than a pivoting antenna assembly as in previous examples. FIG. 9A illustrates a stowed configuration, FIG. 9B illustrates a partially deployed configuration, and FIG. 9C illustrates a fully deployed configuration. Slidably deployable antenna assembly 930 has characteristics similar to antenna assembly 230 and/or antenna assembly 630 but is attached to the body of case 920 in a different manner. Antenna assembly 930 slides out from an inner stowed position rather than hinging, rotating, or pivoting from the body of the case. Slidably deployable antenna assembly 930 may include one or more components of a coupling circuit, such as coupling circuit 250 which are moved into/out of proximity with the native antenna of the electronic device when slidably deployable antenna is deployed/stowed in order to activate/deactivate use of the slidably deployable antenna.

Figure 10:
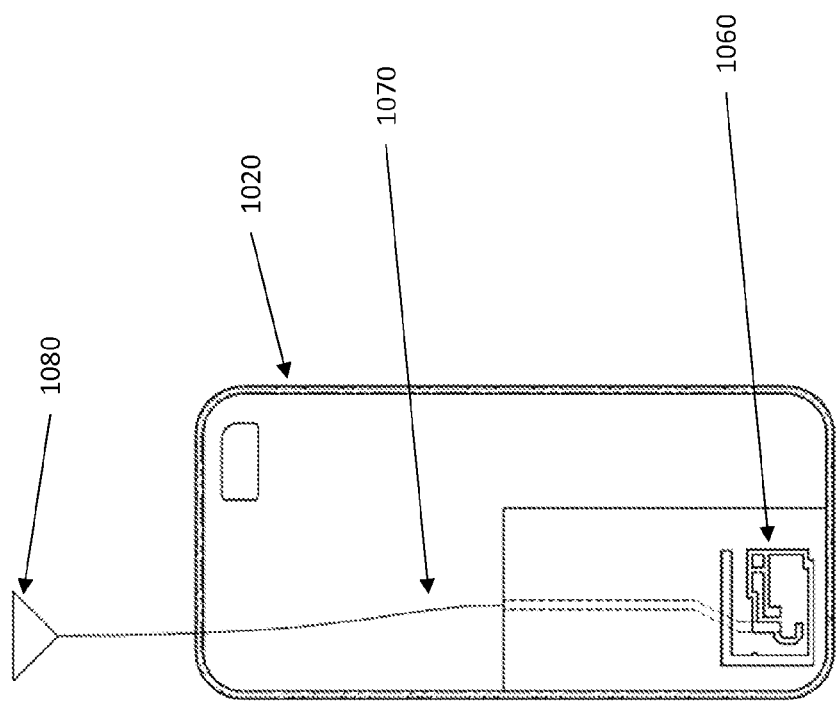
FIG. 10 illustrates a case connected to an external antenna.

FIG. 10 illustrates protective case 1020 connected to an external antenna 1080, which may also sometimes be referred to as a case antenna. External antenna 1080 is coupled to a native or internal antenna of an electronic device in protective case 1020 through transmission line 1070 and a parasitic coupling mechanism 1060. External antenna 1080 is an example of antenna 370. Transmission line 1070 is an example of transmission line feed 240. In some configurations, transmission line 1070 is a two conductor transmission line. Parasitic coupling mechanism 1060 is an example of coupling circuit 250.

External antenna 1080 may be disposed at a different position relative to protective case 1020 such that its radiated fields are omnidirectional, or near omnidirectional, with little influence by and/or interaction with the user of an electronic device in protective case 1020 due to frequency detuning, attenuation, and/or absorption. External antenna 1080 is illustrated as being connected to an upper portion of protective case 1020, but could also be connected to a lower portion, a side portion, a front portion, or a back portion of protective case 1020.

Figure 11:
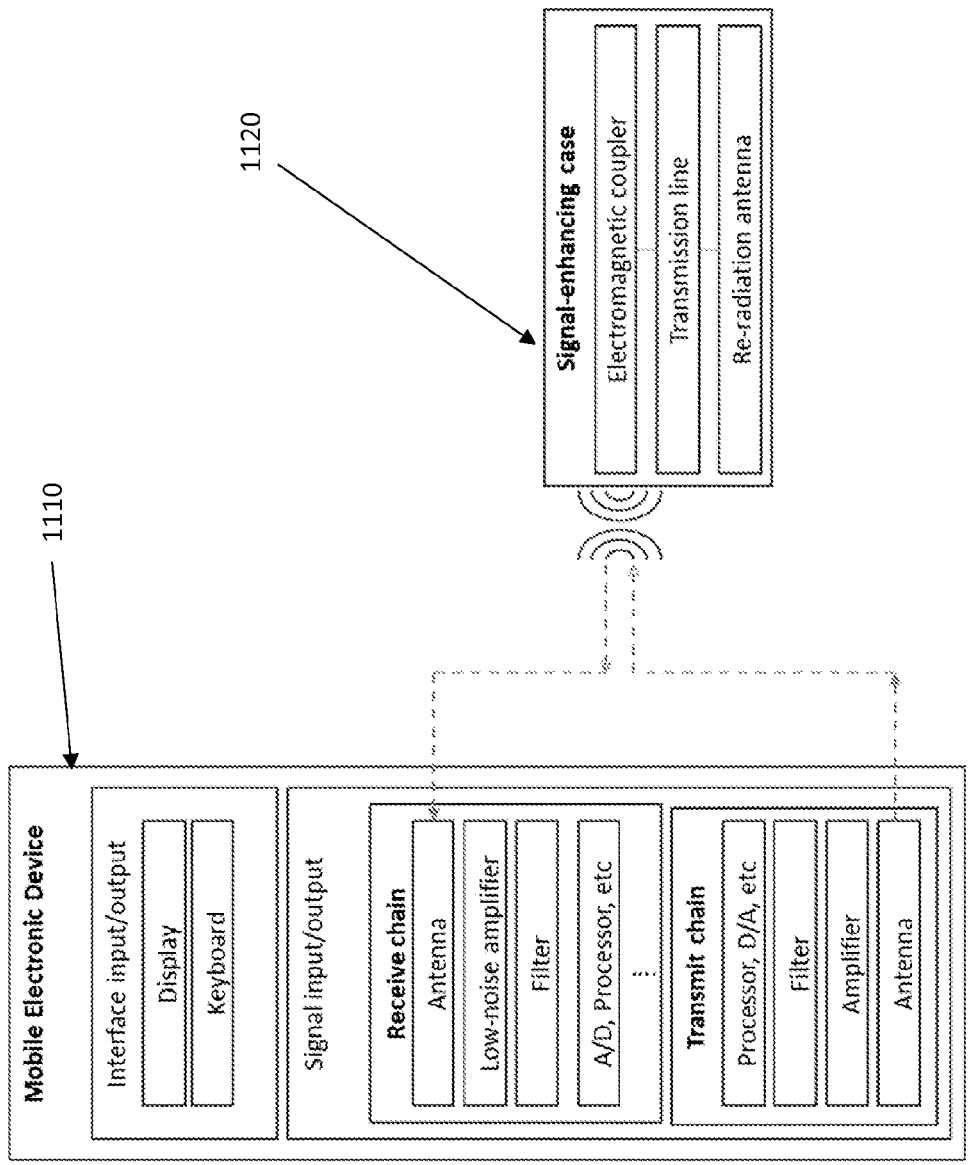
FIG. 11 illustrates a block diagram of an electronic device and a case for the electronic device.

FIG. 11 illustrates a block diagram of a mobile electronic device 1110 and a signal-enhancing case 1120 for mobile electronic device 1110. Mobile electronic device 1110 is an example of electronic device 110. Signal-enhancing case 1120 is an example of case 120, case 220, case 620, case 920, and/or case 1020. Mobile electronic device 1110 includes an interface input/output module with various components (e.g., keyboard, display, speakers, or microphone). Mobile electronic device 1110 also includes a signal input/output module with various components (e.g., receive chain, transmit chain). Mobile electronic device 1110 may also include computing circuitry such as a microprocessor, a central processing unit, a computer processor, application specific circuitry, and/or memory. Signal-enhancing case 1120 may also include computing circuitry such as a microprocessor, a central processing unit, a computer processor, application specific circuitry, and/or memory.

The functions of the signal input/output module of mobile electronic device 1110 may be enhanced by signal-enhancing case 1120 using one or more of the techniques or methods described herein. Signal-enhancing case 1120 includes an electromagnetic coupler which can wirelessly and/or parasitically couple to a native antenna of mobile electronic device 1110 when placed in close proximity to mobile electronic device 1110. The electromagnetic coupler connects directly to a re-radiation antenna of signal-enhancing case 1120 via a transmission line electrically connecting the electromagnetic coupler to the re-radiation antenna.

Various methods of parasitic coupling are known and may be used in the apparatuses, methods, and systems disclosed herein. In addition, various types of transmission lines are known and may be used in the apparatuses and systems disclosed herein. A transmission line consisting of at least two separate conductors may be used. A transmission line with at least two conductors is often used for supporting a guided Transverse Electro-Magnetic mode (TEM mode). A two conductor transmission line may include a microstrip (e.g., two conductors formed by the driven signal trace and the ground plane), a twinlead, a stripline (e.g., the upper and lower ground traces considered a single reference trace), a coaxial line (e.g., a center conductor and outer conductor), and/or a co-planar waveguide (e.g., two planar conductors separated by a small gap). A two conductor guided transmission line increases energy transfer between a coupling device and an antenna. In one example, a flexible, small diameter, low loss coaxial cable may be beneficially used to connect a coupler to an antenna due to its relatively low dispersive characteristics. A coaxial cable's enclosed geometry may also increase isolation and can be routed in various configurations, including in configurations with movable components.

FIGS. 12A-12C illustrate various views of a case 1280 with a parasitic aperture coupling mechanism for electronic device 110. Case 1280 includes an aperture coupling mechanism connected to a microstrip transmission line 1250 which feeds transmission line 1260, which in turns feeds case antenna 1270. The parasitic coupling mechanism is formed by a resonant slot aperture 1230 in a ground plane 1240 which stands off from backplane 1280 of electronic device 110 by a thin non-conductive dielectric slab 1290. A second dielectric slab 1295 separates microstrip feed trace 1250 from aperture 1230. The combination of aperture 1230 and microstrip feed trace 1250, with their appropriate standoff distances defined by the thicknesses of dielectric slabs 1290 and 1295, form a feed technique often referred to as aperture coupling. FIG. 12B illustrates a side view of the case of FIG. 12A. FIG. 12C illustrates a close up section view of the side view of FIG. 12B.

The entire parasitic aperture coupling assembly illustrated in FIGS. 12A-C may be formed by a single two-sided printed circuit board (PCB) which contains microstrip feed trace 1250 on one side and the ground plane 1240 with aperture 1230 removed on the other side. Dielectric slab 1290 may be a bare piece of dielectric. PCB materials often include thin copper foil laminate of ½ oz or 1 oz thickness, adhesively applied to a non-conductive dielectric material such as FR-4, DUROID, or ROGERS materials. The overall thickness is often approximately between 0.01 inches and 0.05 inches. However, other thicknesses are possible. Section view G-G shows a side cutaway view of this assembly.

The characteristics of aperture coupled antennas may be affected by, among other things, changing dimensions of the slot or aperture in the ground plane, and/or changing the placement, dimensions, and/or impedance of the driving microstrip trace over the top of the slot aperture. Therefore, the efficiency of aperture coupling to antenna 1270 can effectively be enabled or disabled by changing one or more dimensions of the aperture. Antenna 1270 may be included in a hinged, pivoting, or sliding assembly as in other examples herein. Antenna 1270 may be moved to a variety of different positions or angles in order to improve the signal strength or quality. In one implementation, one or more dimensions of the aperture are changed when antenna 1270 is rotated into an active or un-stowed position. In other words, when antenna 1270 is in an un-stowed or operational position, the aperture is sized such that the native antenna of electronic device 110 is effectively and/or efficiently coupled through case 1280 to antenna 1270. In this mode, electronic device 110 benefits from the improved signal strength or quality provided by antenna 1270.

In contrast, when antenna 1270 is moved to the stowed or inoperational position, one or more dimensions of the aperture or slot may be changed such that the coupling is no longer efficient, no longer effective, no longer occurs, or is significantly reduced. This effectively decouples antenna 1270 from the native antenna of electronic device 110. In this configuration, the electronic device operates in its 'factory' mode using the internal or native antenna even though the device is installed in or attached to inventive case. The connection to antenna 1270 may automatically occur when antenna 1270 is opened, unstowed, extended, flipped open, or otherwise activated and disconnection may automatically occur when antenna 1270 is closed, stowed, deactivated, or returned to a home position. The coupling may also be enabled or disabled by changing one or more other dimensions or parameters, such as by changing a size of the patch that makes up the patch antenna.

In some configurations, the changing of the aperture size discussed above may occur through a shutter or shutter-type mechanism that changes the size of aperture 1230 in response to physical movement of antenna 1270. In other situations, the changing of the aperture size may occur in response to a separate action of the user. This separate action may be activation of an electrical switch, manipulation of a mechanical element, selection of an option in a software application or program, or a combination thereof.

When the external antenna is in the stowed position, the parasitic coupling mechanism may be disengaged, as if it were a shutter being opened, thereby allowing the native antenna to revert to its 'factory' condition or mode of operation. When the external antenna is deployed, the parasitic coupling mechanism engages, as in a shutter closing over the native antenna. This mechanism involves the user in the operation of the device. An LED or other visual or audible cue may also be included on the case when the external antenna is deployed and/or when a certain signal quality or strength threshold condition is satisfied. For example, the cue may be activated when the signal strength or quality exceeds a specified value, which may not otherwise be met when the external antenna is stowed, or if a specified minimum data transfer rate is exceeded.

The parasitic coupling mechanisms described herein may allow a user to simply install a protective case as if it were a typical external protective case with no electrical interfaces or functions. The parasitic coupling mechanism reroutes or transfers electromagnetic energy, which would have otherwise been radiated into free space, to the case antenna via a transmission line. Beneficially, energy is coupled from the native antenna to this more effective antenna via a simple installation procedure that may not require the user to make RF or electrical connections.

However, instead of parasitic coupling, in some configurations, one or more of the cases described herein may include an electromechanical interface for making a direct electrical connection or hardwired connection between an antenna of the case and an electronic device. The electromechanical interface to the electronic device may be in addition to or in place of the wireless interface techniques disclosed herein. The electromechanical interface may enable a user to attach a larger or different type of antenna that provides even greater signal strength and/or quality improvements under certain circumstances. The electromechanical interface may enable a user to temporarily attach a directional or beam antenna when in remote locations where the native antenna, and possibly even a case antenna as disclosed herein, may not be sufficient.

For example a hiker going on an expedition may separately carry another antenna, such as a Yagi antenna, for emergency situations. A Yagi antenna is a directional antenna consisting of a driven element, such as a dipole or folded dipole, and additional parasitic elements. Yagi antennas typically provide significant increases in directionality and gain over dipole antennas. Other types of alternative external antennas are possible. The electrical interface to which this type of antenna is connected may also be configured to disconnect a case antenna when the connection is made. In other words, a case may provide a connection to a case antenna when the case antenna is activated, extended, flipped out, or unstowed, but may also automatically disconnect the case antenna when a Yagi or other alternative external antenna is attached.

The coupling mechanisms described herein may also be used for electronic devices where an RF port is available which bypasses the native antenna and routes electromagnetic energy directly into and/or out of the RF front-end of the electronic device. This approach uses an RF connector to route energy from the mobile device to the transmission line to the external antenna, versus the parasitic coupling mechanism. In some configurations, this may result in a more direct and/or efficient coupling of the RF signal from the external antenna into the electronic device's RF front-end circuitry where the signal is processed.

Switching between the various antenna configurations described herein may be manually controlled by a user and/or may be controlled using a software application. In some situations, the electromechanical interface is an RF port that may either be on electronic device or on a case. In some situations, an external antenna attached to the electronic device or to case may be configured as an array of two or more antennas. The array may or may not include the native antenna of the electronic device and/or the case antenna.

As described herein, a case may also include an antenna port for hooking up an alternate, higher gain, and/or directional antenna to the transmission line/coupling mechanism which bypasses the external antenna. This may be useful in areas that are particularly poorly served by a cellular base station or other wireless communication system such as wilderness areas for camping or hunting. The directional antenna may be attached to the secondary RF port and signals are routed to and from the folding antenna instead to the directional antenna. The directional antenna may be lightweight and able to be folded and stowed compactly. The protective case may include one or more slots or recesses for stowing of the directional antenna. When unfolded and deployed, the directional antenna is attached via an RF cable to the port so the phone can be used in remote areas or other areas with challenging signal conditions.

A software application ("app") may also be used in conjunction with the case and/or antennas or configurations described herein. The software application may be used to help determine one or more locations of cellular towers, base stations, or other signal sources. This information may be used to assist the user in pointing or aiming a directional antenna. The software application may gather information about the user's position or location from a GPS receiver in the electronic device, from an external GPS receiver, from a base station, and/or from a compass. This information may be cross-referenced to a database of positions of towers or base stations that may be accessible by the device. The database may be stored in the electronic device, in the software application, or may be accessed externally. The software application may also indicate a line of bearing from the user's position to the tower or base station for assistance in positioning or aiming the directional antenna.

During the course of normal electronic device usage, the software application may also notify the user when he or she is approaching an area of known poor signal strength or quality. This notification may also include a suggestion or notification to deploy the otherwise stowed antenna in order to improve signal quality. In some configurations, the software application may run in the background and track user location to alert the user when approaching an area where signal strength is known to be poor, where calls are frequently dropped, and/or where other signal quality issues exist. A signal quality database may contain data gathered from that device, from that user, from a service provider, and/or from a crowdsourced data source that gathers information from many users. The user may be able to configure various aspects, features, or parameters of the software application to operate in a preferred or customized manner.

The software application may be stored in the electronic device or may be stored in the protective case and downloaded to the electronic device from the protective case. In addition, the software application may be downloaded from a remote server, such as from a software application store or website.

A case or supplemental antenna used in accordance with the techniques and methods introduced herein may be substantially larger and/or more effectively placed than an internal antenna of an electronic device, smartphone, or a mobile computing device. In one example, a case may include a single external antenna of a wideband dipole design that flips out from a stowed position in the case via a hinging mechanism which may also accommodate the transmission line. The antenna may be printed onto a thin printed circuit substrate or may be made from a stamped metallic material and laid into and surrounded by a thin plastic or other dielectric 'housing' which resembles a folding paddle mechanism. In some configurations, there may be a hinge on the bottom of the case with the antenna extending below the bottom surface of the electronic device. This configuration may be preferred over a top or upper mounted antenna because the native antenna is frequently located at the bottom of the electronic device in order to meet FCC limits on radiation into a user's head. In this configuration, the transmission line run may be shorter with an antenna mounted near the bottom. In addition, a bottom mounted external antenna may tend to direct radiation in a generally upward direction toward a communication tower rather than downward toward the ground. An up-tilted pattern of a bottom antenna is sometimes preferred over the down-tilted pattern of an upper antenna.

FIGS. 13A and 13B illustrate alternate sides of a circuit board containing a planar wideband flared dipole antenna fed with a Dyson microstrip-to-twinlead balun. In some configurations, the antenna may be a wideband dipole with either an integrated Dyson balun or a lumped-element balun consisting of a transformer, such as a 1:1 impedance transformer for example. A balun converts an unbalanced coax signal into a balanced dipole signal. In the illustrated configuration, the entire antenna and its feed are disposed on two sides of a thin printed circuit board. One side of the two sided PCB contains signal trace 1310, or that part connected to the center conductor of the feed cable. The other side of the PCB contains grounded trace 1320. The Dyson feed is formed by microstrip conductor 1330 on the signal side 1310 of the PCB and microstrip ground 1340 formed on ground side of the PCB. Microstrip ground 1340 and microstrip conductor 1330 gradually taper in width so that they are equal twin lead conductors at feed point 1350. The Dyson feed transitions from the unbalanced microstrip at the interface to the cable to balanced currents at feed point 1350 by tapering over the length of the negative dipole half. The ground microstrip trace is at the center of the U-shaped negative half and gradually tapers together with the signal trace to twin lead (e.g., equal-sized traces) over a lambda/4 distance, where lambda is the wavelength.

In other approaches, a lumped element feed places small chip-level inductors and ferrite components at the feed point to create a transformer with a single unbalanced input and two equal and opposite balanced outputs of any impedance. In some configurations, this approach may be less desirable since it may be lossy and may require placement of additional components.

Figure 14:
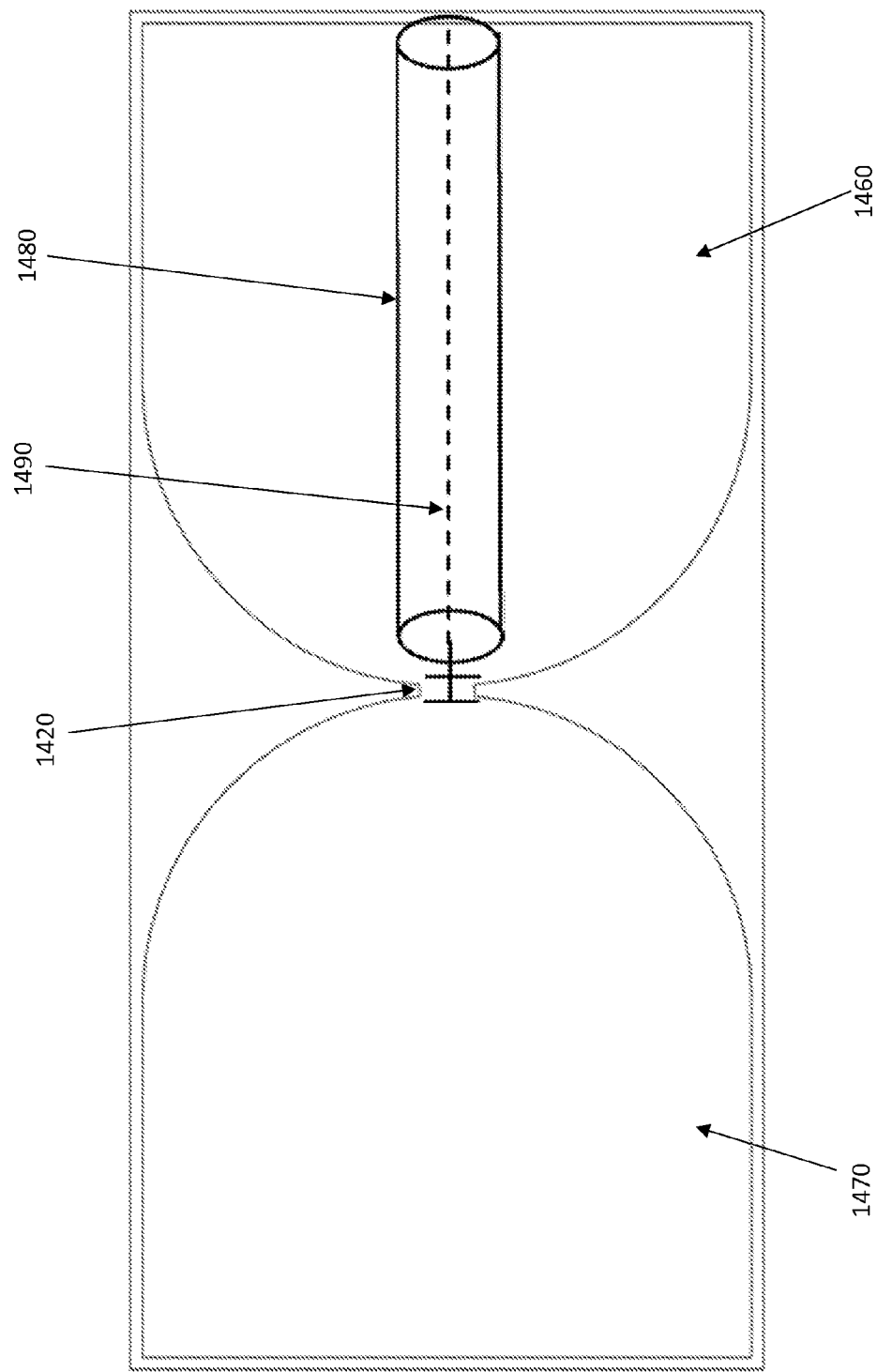
FIG. 14 illustrates a planar wideband flared dipole antenna with a coaxial Dyson balun.

FIG. 14 illustrates a coaxial Dyson balun is created by connecting an outer jacket 1480 of a feed coaxial cable directly to a ground-side 1460 of the dipole over the full length of this half of the dipole and jumpering the center conductor 1490 of the cable to the opposite half of the dipole 1470 at feed point 1420. This configuration may be referred to as an infinite Dyson balun.

Figure 15:
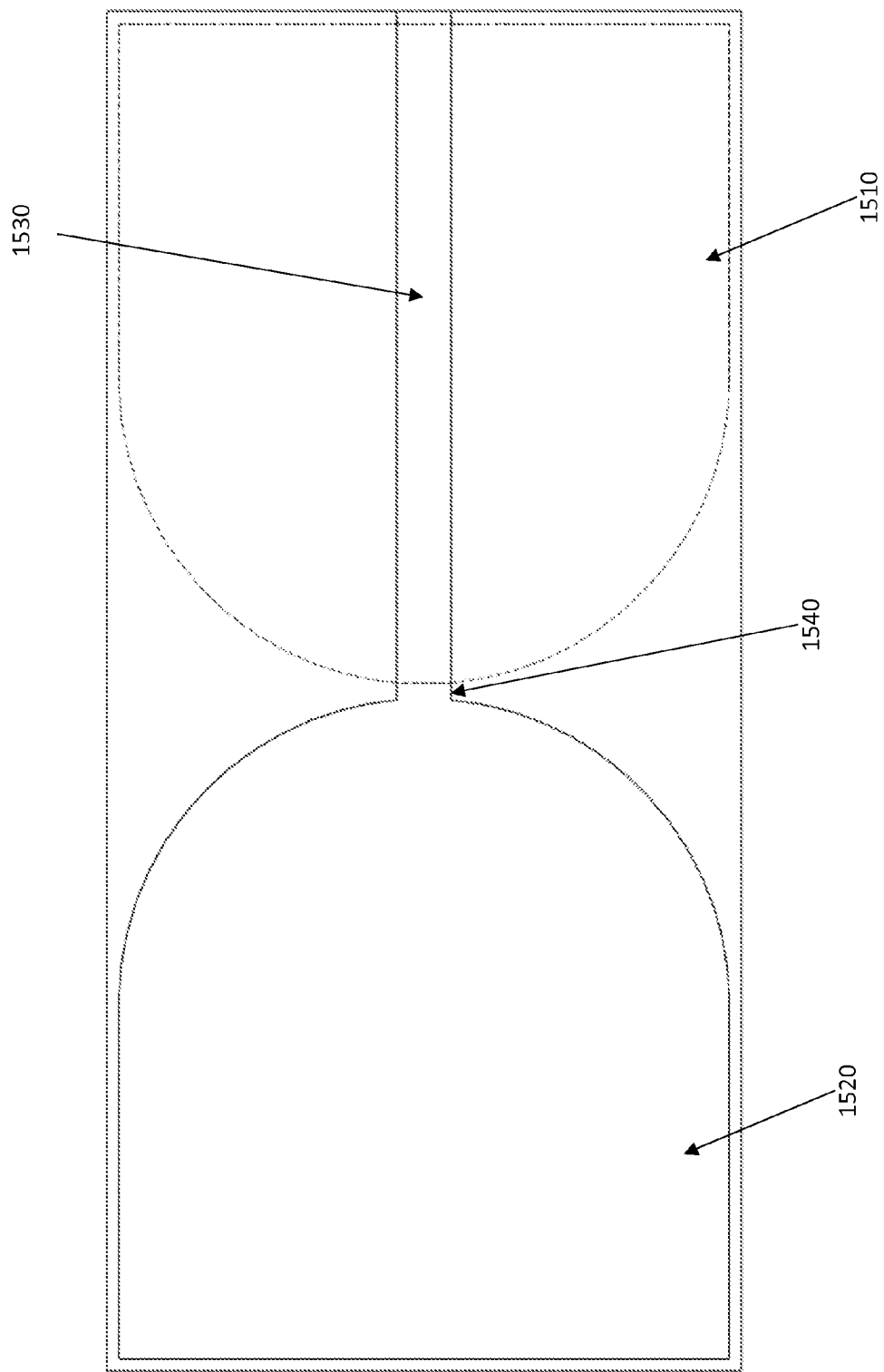
FIG. 15 illustrates a planar wideband flared dipole fed with an unbalanced microstrip transmission line.

FIG. 15 illustrates an unbalanced microstrip direct feed. The design illustrated in FIG. 15 is relatively simple but may promote radiated currents interacting with the feed and ground traces. The center conductor of the feed line attaches directly to the signal side of the microstrip trace 1530. The ground side of the feed line attaches to the ground side of the dipole half 1510. Signal trace 1530 feeds positive dipole half 1520 at feed point 1540. Because the transition from unbalanced microstrip currents to balanced dipole currents occurs abruptly at feed point 1540, return currents are promoted on the ground side of the feed line. This increases the interaction of transmitted currents and fields with the chassis of an electronic device and/or with the user holding it. By contrast, a balanced Dyson feed with a balanced antenna mitigates interaction between the user and the transmit antenna to the greatest extent possible.

A transmission line which feeds the antenna, whether it is a coaxial Dyson feed or a microstrip feed, may connect to a small flexible transmission line that is routed through a hinged joint in order to implement a deployable antenna. FIG. 16A illustrates antenna assembly 1650 in one example of small flexible transmission line routed through a hinged joint. FIG. 16B illustrates an exploded view of the hinge area of FIG. 16A. In FIG. 16B, miniature slot 1660 is cut into the antenna assembly 1650 which allows miniature coaxial cable 1670 to interface to the antenna conductor contained within antenna assembly 1650. The routing of the hinged transmission line may utilize a technique sometimes used in laptop computers with hinged displays in which the cable is routed through the middle of the joint with enough slack in the cable so it can rotate freely. The cable may attach to a feed point on the coupler.

The case antennas, transmission lines, and couplers described herein may be designed such that one or more of them may be treated like separable modules in an RF chain with their own set of modular network parameters (e.g., input and output impedance, insertion loss, etc.).

The apparatuses, techniques, methods, and systems disclosed herein may raise or lower the radiation point of the antenna, sometimes referred to as the 'phase center,' to a point above or below the electronic device's upper surface such that the radiation pattern of the external antenna is predominantly omni-directional in the azimuth plane, or the plane which is perpendicular to the plane of the screen of the electronic device. For example, it has been found that certain antennas placed above or below the device's upper or lower surface tend to shape the radiation in the elevation plane differently toward a cellular base station. Consequently, electromagnetic radiation may be routed away from a user's head or hand in a direction that results in a reduction in the amount of energy directed at the user's head and/or hand.

Measurements indicate that between 2 decibels and 10 decibels of improvement in Total Radiated Power (TRP) and Total Isotropic Sensitivity may be obtained using the techniques described herein. This measurement involved on-body measurements of TRP and TIS in a CTIA certifiable test range. The performance comparison was of a bare SAMSUNG GALAXY S4 phone and the SAMSUNG GALAXY S4 with prototype invention installed. A similar measurement was performed for the IPHONE 5s and the improvements were on the order of 3 decibels to 6 decibels because of sensitivity of the parasitic coupler. In both scenarios, the radiated power density and received power density with respect to angle was transformed from highly perturbed with significant human blockage in the bare device next-to-head case, to highly omni-directional and with substantially higher power output (or input, for receive) in the with-product case. These results demonstrate the ability to improve quality of service by changing the point in space from which radiation occurs.

The techniques described herein may also increase the effective size of and efficiency of the native antenna by redirecting electromagnetic energy to a larger external antenna. Increasing the size and efficiency of the native antenna typically improves the device's sensitivity to weak signals and improves the device's ability to connect to a base station or other remote device at farther distances and/or to a base station that is inconveniently located with respect to the user's location and/or suffering from other signal quality issues such as fading, interference, and/or reflections. In many situations, the signal improvements associated with these antenna improvements will result in fewer dropped calls and/or improved data transfer rates.

An external antenna can be an antenna that is deployable from the case or can be an antenna that is internal to the case. One example of an external deployable antenna would be a mechanism where a deployable or positionable structure has a metalized antenna pattern embossed, printed, or attached to it. It may be deployed from the protective case, by folding, pivoting, sliding, and/or extending out from the case. The metalized antenna pattern could be any of a wide range of antenna designs (e.g. standard dipole, bowtie dipole, tapered dipole, microstrip patch, slot, multi-element antenna, etc.) that are designed or configured for performance at one or more of the RF frequency bands the electronic device is designed for. This deployable antenna approach has the advantage of allowing for the phase center of the radiated/received signal to be further away from the body of an individual using the device thereby reducing the effect of the body on the RF signal quality.

One example of an external antenna that is internal to the protective case could be an antenna made from a metalized area of the protective case itself, such as an internal layer of the case, an outer surface of the back-side of the case, an outer surface of the edges of the case, and/or a metalized area of a transparent screen cover. A number of switchable antenna apertures could be implemented with one or more metalized structures internal to the protective case to implement a multi-aperture, beam-steerable antenna. The antenna(s) and/or switches internal to the protective case could be configured such that software in the electronic device automatically optimizes signal reception/transmission by controlling the receive/transmit beam state and/or the effective polarization of the external antenna aperture. The multi-aperture and/or beam-steerable aspects could be further or alternatively controlled using internal sensor information from the electronic device as it detects orientation of the device and optimizes the external antenna aperture receive/transmit beam states.

In some examples, a visual, audio, and/or haptic indicator may be used to provide real time, or near real time, feedback that the apparatuses, methods, and/or techniques disclosed herein are operating as intended and/or providing the intended benefit. As described in previous examples, a software application, or app, may run on the electronic device to facilitate, implement, and/or provide information about some of the features described herein.

In one example, a software application may run in the background and alert the user when they are approaching an area of known poor signal quality. The alert may indicate to the user that the external antenna should be deployed in order to avoid a dropped connection or other undesirable event. The information on which the alert is based may include one or more of a database custom to the individual user and their use patterns, dropped call and/or signal statistics, and/or crowd-sourced data such as that provided by ROOTMETRICS or OPENSIGNAL. The software application may cross-reference the user's position against a stored database of position coordinates of antenna towers which are accessible to the particular user's device (e.g., those that can be accessed either as part of the user's network provider or through roaming). The software application may also alert the user which direction the tower is located with respect to user's position for assistance in pointing or sighting the external antenna.

In other examples, the techniques introduced herein may be performed in the form of one or more methods. In some situations, some aspects of the techniques introduced herein may be performed by one or more software applications running on one or more computer processors of the electronic device, one or more computer processors of a case for the electronic device, and/or a combination thereof.

While many of the examples provided herein describe the various apparatuses, techniques, methods, and systems disclosed herein as implemented in a case or a protective case for an electronic device, they may also be implemented in other forms and are not to be limited to cases or protective cases. In one example, the techniques may be implemented in a docking station for an electronic device. In another example, they may be implemented in a mount or holder for an electronic device. In yet another example, they may be implemented in a peripheral device that is attached to or connected to an electronic device.

The methods, techniques, apparatuses, systems, and components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration," and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A protective case for improving radio frequency signal quality of a mobile electronic device, the protective case comprising:
    a shell that encases at least a portion of the mobile electronic device;
    an external antenna assembly position-ably attached to the shell to improve signal strength by positioning the external antenna assembly relative to the shell;
    a transmission line attached to the shell and electrically interconnected to the case antenna; and
    a near-field coupling device attached to the shell and having a feed port electrically interconnected to the transmission line, the near-field coupling device configured to near-field couple to a native antenna of the encased mobile electronic device to capture an electromagnetic signal generated by the native antenna of the mobile electronic device and further configured to receive a second electromagnetic signal at the feed port and near-field couple the second electromagnetic signal to the native antenna of the mobile electronic device, the second electromagnetic signal received at the feed port from the case antenna through the transmission line.

2. The protective case as claimed in claim 1, wherein the near-field coupling device is configured to near-field couple to a native antenna of the encased mobile electronic device by being disposed close to the native antenna.

3. The protective case as claimed in claim 1, wherein the near-field coupling device is substantially impedance matched to the native antenna of the mobile electronic device.

4. The protective case as claimed in claim 3, wherein the near-field coupling device is substantially impedance matched to the native antenna of the mobile electronic device by adjusting the tuning parameters of the near-field coupling device.

5. The protective case as claimed in claim 1, wherein the near-field coupling device reduces an uncoupled radiation level of the native antenna when the near-field coupling device is coupled to the native antenna, the uncoupled radiation level being a level of radiation produced by the native antenna of the mobile electronic device when the near-field coupling device is not coupled to the native antenna of the mobile electronic device.

6. The protective case as claimed in claim 1, wherein the external antenna position-ably attached to the shell has at least a stowed position and an unstowed position.

7. The protective case as claimed in claim 6, wherein the near-field coupling device near-field coupling to the native antenna is discontinued when the external antenna is in the stowed position.

8. The protective case as claimed in claim 6, wherein the near-field coupling device is configured to near-field couple to the native antenna in response to the external antenna being moved from the stowed position to the unstowed position.

9. The protective case as claimed in claim 1, wherein the external antenna is configured to pivot relative to the shell while maintaining the electrical interconnection to the transmission line in order to improve the signal strength or quality.

10. The protective case as claimed in claim 9, wherein the external antenna has a degree of movement relative to the shell in addition to the pivoting relative to the shell.

11. The protective case as claimed in claim 1, wherein the transmission line is a two conductor transmission line and the captured signal is passively conducted from the near-field coupler to the case antenna through the transmission line.

12. A method of improving signal quality for a smartphone using a protective encasement for the smartphone, the protective encasement having a near-field coupler, a supplementary antenna, and an electrical transmission line electrically interconnecting the near-field coupler and the supplementary antenna, the method comprising:

wirelessly capturing a signal electromagnetically radiated by an internal antenna of the smartphone using the near-field coupling device, the near-field coupling device positioned in proximity to the internal antenna of the smartphone by the encasement to near-field couple to the internal antenna of the smartphone to receive the signal radiated by the internal antenna of the smartphone;

conducting the captured signal from a feed port of the near-field coupling device through the transmission line to the supplementary antenna of the encasement;

transmitting the captured signal by the supplementary antenna;

receiving an electromagnetically radiated second signal by the supplementary antenna of the encasement;

conducting the received second signal from the supplementary antenna of the encasement through the transmission line to the near-field coupling device to couple the received second signal into the internal antenna of the smartphone; and positioning the external antenna assembly relative to the protective encasement to improve strength of the transmitted captured signal and the received second signal.

13. The method as claimed in claim 12, wherein the captured and the received signals are passively conducted through the transmission line.

14. The method as claimed in claim 12 wherein the wireless capturing, the transmitting, and the receiving occur only when the near-field coupling device is in an activated state.

15. The method of claim 14 wherein the near-field coupling device is toggled between the activated state and a deactivated state based on a position of the supplementary antenna relative to the encasement.

* * * * *